US008090116B2

(12) United States Patent
Holmi et al.

(10) Patent No.: US 8,090,116 B2
(45) Date of Patent: Jan. 3, 2012

(54) VEHICLE DIRECTIONAL ELECTROACOUSTICAL TRANSDUCING

(76) Inventors: Douglas J. Holmi, Marlborough, MA (US); Guy A. Torio, Ashland, MA (US)

(*) Notice: Subject to any disclaimer, the term of this patent is extended or adjusted under 35 U.S.C. 154(b) by 1624 days.

(21) Appl. No.: 11/282,871

(22) Filed: Nov. 18, 2005

(65) Prior Publication Data

US 2007/0116298 A1 May 24, 2007

(51) Int. Cl.

| | |
|---|---|
| ***H04B 1/00*** | (2006.01) |
| ***H04R 5/00*** | (2006.01) |
| ***H04R 5/02*** | (2006.01) |
| ***H04R 1/02*** | (2006.01) |

(52) U.S. Cl. ................ 381/86; 381/1; 381/17; 381/389; 381/89; 381/302; 381/304; 381/307

(58) Field of Classification Search .................... 381/86, 381/1, 302, 337, 306–310, 27, 17–19
See application file for complete search history.

(56) References Cited

U.S. PATENT DOCUMENTS

| | | | | |
|---|---|---|---|---|
| 4,503,553 | A | 3/1985 | Davis | |
| 5,210,802 | A | 5/1993 | Aylward | |
| 5,325,435 | A * | 6/1994 | Date et al. | 381/1 |
| 5,587,048 | A | 12/1996 | Streisel et al. | |
| 5,809,153 | A | 9/1998 | Aylward et al. | |
| 5,870,484 | A | 2/1999 | Greenberger | |
| 5,887,071 | A | 3/1999 | House | |
| 5,953,432 | A | 9/1999 | Yanagawa et al. | |
| 6,327,370 | B1 * | 12/2001 | Killion et al. | 381/313 |
| 7,343,020 | B2 * | 3/2008 | Thigpen | 381/302 |
| 7,433,483 | B2 * | 10/2008 | Fincham | 381/337 |
| 7,702,320 | B2 * | 4/2010 | Komura | 455/416 |
| 2004/0105550 | A1 | 6/2004 | Aylward et al. | |
| 2004/0196982 | A1 * | 10/2004 | Aylward et al. | 381/17 |
| 2005/0152562 | A1 | 7/2005 | Holmi et al. | |

FOREIGN PATENT DOCUMENTS

| | | |
|---|---|---|
| DE | 19938171 | 3/2001 |
| JP | 2005-210717 A | 8/2005 |

OTHER PUBLICATIONS

CN Office Action dated Dec. 25, 2009 for CN Appl. No. 200610064366.0.
Extended European Search Report dated Jan. 30, 2009 for EP Application No. 06124362.2-1224 / 1788838.
Harry F. Olsen. "Gradient Loudspeakers," J. of the Audio Engineering Society, Mar. 1973, vol. 21, No. 2.
JP Office Action date Feb. 15, 2011 for JP Appin. No. 2006-311620.

* cited by examiner

*Primary Examiner* — Devona Faulk
(74) *Attorney, Agent, or Firm* — Bose Corporation

(57) ABSTRACT

Vehicle audio systems including directional loudspeakers, particularly directional arrays. An exemplary audio system for a vehicle includes a plurality of audio channels. The vehicle includes a first passenger position and a second passenger position ahead of the first passenger position. The audio system includes a first directional loudspeaker positioned ahead of the first passenger position and in back of the second passenger position, constructed and arranged to radiate directionally a first audio channel so that a direction toward the first passenger position is one of a low radiation direction and a high radiation direction and so that a direction toward the second passenger position is the other of a low radiation direction and a high radiation direction.

43 Claims, 13 Drawing Sheets

VEHICLE DIRECTIONAL ELECTROACOUSTICAL TRANSDUCING

BACKGROUND

This specification describes the use of directional loudspeakers in vehicle passenger compartments. One popular type of directional loudspeaker is a directional acoustic array. Information on directional acoustic arrays can be found in Harry F. Olson, "*Gradient Loudspeakers,*" *J. of the Audio Engineering Society*, March 1973, Volume 21, Number 2, in U.S. Pat. No. 5,870,484, and in U.S. Pat. No. 5,809,153.

SUMMARY

In one aspect of the invention an audio system for a vehicle includes a plurality of audio channels. The vehicle includes a first passenger position and a second passenger position ahead of the first passenger position. The audio system includes a first directional loudspeaker positioned ahead of the first passenger position and in back of the second passenger position, constructed and arranged to radiate directionally a first audio channel so that a direction toward the first passenger position is one of a low radiation direction and a high radiation direction and so that a direction toward the second passenger position is the other of a low radiation direction and a high radiation direction.

The directional loudspeaker may be further constructed and arranged to radiate a second audio channel. The directional loudspeaker may be further constructed and arranged to radiate directionally the second audio channel so that a direction toward the passenger position to which the first channel low radiation direction is directed is a second channel high radiation direction and the direction toward the passenger position to which the first channel high radiation direction is directed is a second channel low radiation direction. The vehicle may further include a third passenger position to the right and ahead of the first passenger position and to the right of the second passenger position and a fourth passenger position, to the right of the first passenger position, to the right and in back of the second passenger position, and in back of the third passenger position. The directional loudspeaker may be mounted in back of the second and the third passenger positions, ahead of the first and fourth passenger positions, to the right of the first and the second passenger positions, and to the left of the third and the fourth passenger positions. The directional loudspeaker may be further constructed and arranged to radiate directionally a third audio channel so that a direction toward the third passenger position is one of a low radiation direction and a high radiation direction and to radiate directionally a fourth audio channel so that the direction toward which the third channel low radiation direction is directed is a fourth channel high radiation direction. The audio system may further include circuitry for delaying one of a first audio channel signal and a second audio channel signal to the first directional loudspeaker. The audio system may further include circuitry for delaying the other of the first audio channel signal and the second audio signal to the second directional loudspeaker.

The directional loudspeaker may be mounted in vehicle door. The directional loudspeaker may be mounted in or on a seatback of a seat associated with the second passenger position. The directional loudspeaker may be mounted in a headliner of the vehicle. The directional loudspeaker may be mounted in a B-pillar.

The audio system may further include a second loudspeaker, positioned ahead of the second passenger position, constructed and arranged to radiate the first audio channel. The first loudspeaker may be further constructed and arranged to directionally radiate the first channel so that the direction toward the first passenger position is a high radiation direction and wherein the second loudspeaker is a directional loudspeaker constructed and arranged to radiate the first audio channel so that the direction toward the second passenger position is a high radiation direction. The second loudspeaker may be further constructed and arranged to radiate the first audio channel so that a direction toward a vehicle windshield is a low radiation direction.

The first directional loudspeaker may be constructed and arranged to alternatively radiate omni-directionally or directionally based on pre-determined criteria. The pre-determined criteria may include the presence or absence of an occupant of the first passenger position. The audio system may further include a detector for detecting the presence or absence of an occupant of the first passenger position.

The SPL in the low radiation direction may be at a level at least −6 dB with respect to the maximum radiation in any direction for points equidistant from the directional loudspeaker. The SPL in the low radiation direction may be at a level at least −10 dB with respect relative to the maximum radiation in any direction for points equidistant from the directional loudspeaker. The SPL in the high radiation direction may be within 4 dB of the maximum radiation in any direction for points equidistant from the directional loudspeaker.

The vehicle includes a third passenger position in back of the first passenger position, the audio system further includes a second directional loudspeaker positioned in back of the first directional loudspeaker and ahead of the third passenger position, constructed and arranged to radiate directionally the first audio channel so that the direction toward the first passenger position is one of a low radiation direction and a high radiation direction and so that the direction toward the third passenger position is the other of a low radiation direction and a high radiation direction. The second directional speaker may be constructed and arranged to radiate directionally a second audio channel so that the direction toward the third passenger position is a high radiation direction and so that the direction toward the first passenger position is a low radiation direction.

The directional loudspeaker may be constructed and arranged to alternatively radiate the first audio channel or an audio signal from an auxiliary device. The auxiliary device may be a radiotelephone.

The audio system may further include circuitry for delaying a first channel audio signal to the first directional loudspeaker The first directional loudspeaker may be constructed and arranged to radiate directionally a second channel so that the direction toward the first passenger position is the other of a low radiation direction and a high radiation direction. The first directional loudspeaker may be further constructed and arranged to radiate directionally the second channel so that the direction toward the second passenger position is the other of a low radiation direction and a high radiation direction. The SPL in the low radiation direction may be a level at least −6 dB with respect to the maximum radiation in any direction for points equidistant from the directional loudspeaker.

The audio system may further include a third passenger position to the right and ahead of the first passenger position and to the right of the second passenger position The first directional loudspeaker may be constructed and arranged to radiate directionally the first audio channel so that the direction toward the second passenger position is a high radiation direction and so that more acoustic energy is directed toward the third passenger position than is directed towards the second passenger position. The direction toward the second passenger position and the direction toward the third passenger position may both be high radiation directions.

In another aspect, a method for operating a vehicle audio system for a vehicle, the audio system including a plurality of audio channels, the vehicle including a first passenger position and a second passenger position ahead of the first passenger position, includes: radiating directionally a first audio channel so that a direction toward the first passenger position is one of a low radiation direction and a high radiation direction and so that a direction toward the second passenger position is the other of a low radiation direction and a high radiation direction.

The method may further include radiating a second audio channel. The radiating the second audio channel may include radiating directionally the second audio channel so that a direction toward the passenger position to which the first channel low radiation direction is directed is a second channel high radiation direction and the direction toward the passenger position to which the first channel high radiation direction is directed is a second channel low radiation direction. The vehicle may further include a third passenger position to the right and ahead of the first passenger position and to the right of the second passenger position and a fourth passenger position, to the right of the first passenger position, to the right and in back of the second passenger position, and in back of the third passenger position. The directional loudspeaker may be mounted in back of the second and the third passenger positions, ahead of the first and fourth passenger positions, to the right of the first and the second passenger positions, and to the left of the third and the fourth passenger positions. The method may further include radiating directionally a third audio channel so that a direction toward the third passenger position is one of a low radiation direction and a high radiation direction and radiating directionally a fourth audio channel so that the direction toward which the third channel low radiation direction is directed is a fourth channel high radiation direction. The method may further include delaying one of a first audio channel signal and a second audio channel signal to the first directional loudspeaker. The method may further include delaying the other of the first audio channel signal and the second audio signal to the second directional loudspeaker. The method in accordance may further include radiating omni-directionally a second audio channel.

The vehicle may further include a second loudspeaker, positioned ahead of the second passenger position. The method may further include radiating a second audio channel. The radiating the second channel may include radiating directionally the second audio channel so that the direction toward the second passenger position is a high radiation direction. The radiating the second audio may further include radiating directionally the second audio channel so that a direction toward a vehicle windshield is a low radiation direction.

The radiating may alternatively include one of radiating omni-directionally or radiating directionally based on pre-determined criteria. The pre-determined criteria comprise the presence or absence of an occupant of the first passenger position. The method may further include detecting the presence or absence of an occupant of the first passenger position. The SPL in the low radiation direction may be at a level at least −6 dB with respect to the maximum radiation in any direction for points equidistant from the directional loudspeaker. The SPL in the low radiation direction may be at a level at least −10 dB with respect to the maximum radiation in any direction for points equidistant from the directional loudspeaker. The SPL in the high radiation direction is within 4 dB of the maximum radiation in any direction for points equidistant from the directional loudspeaker.

The vehicle may include a third passenger position in back of the first passenger position. The audio system may further include a second directional loudspeaker positioned in back of the first directional loudspeaker and ahead of the third passenger position. The method may further include radiating directionally the first audio channel so that the direction toward the first passenger position is one of a low radiation direction and a high radiation direction and so that the direction toward the third passenger position is the other of a low radiation direction and a high radiation direction. The method may further include radiating directionally a second audio channel so that the direction toward the third passenger position is a high radiation direction and so that the direction toward the passenger position toward which the first channel high radiation is directed is a low radiation direction.

The method may include alternatively radiating directionally so that the direction toward the second passenger position is a high radiation direction the first audio channel or audio signals from an auxiliary device. The auxiliary device may be a radiotelephone.

The method may include delaying a first channel audio signal to the first directional loudspeaker.

The method for operating a vehicle audio system for a vehicle may further include radiating directionally a second channel so that the direction toward the second passenger position is the one of a low radiation direction and a high radiation direction and so that the direction toward the first passenger position is the other of the high radiation direction and the low radiation direction. The SPL in the high radiation direction may be within 4 dB of the maximum radiation in any direction for points equidistant from the directional loudspeaker.

In another aspect, an audio system for a vehicle may include passenger positions and an acoustically reflective surface. The directional loudspeaker may be constructed and arranged to radiate directionally acoustic energy so that the direction toward a passenger position is one of a high radiation direction and a low radiation direction and so that the direction toward the reflective surface is the other of the high radiation direction and the low radiation direction. The reflective surface may be a windshield. The reflective surface may be one of a tailgate window and a rear window.

In another aspect, a method for operating a vehicle audio system, the vehicle including passenger positions and an acoustically reflective surface, includes: radiating directionally acoustic energy so that the direction toward a passenger position is one of a high radiation direction and a low radiation direction and so that the direction toward the reflective surface the other of a high radiation direction and a low radiation direction. The reflective surface may be a windshield. The reflective surface may be one of a tailgate window and a rear window.

In another aspect, a vehicle includes a passenger location and a microphone for detecting acoustic energy. An audio system for the vehicle may include a directional loudspeaker constructed and arranged to radiate sound directionally so that the direction toward the passenger location is a high radiation direction and so that the direction toward the microphone is a low radiation direction. The microphone may be a component of a vehicle noise compensation system. The microphone may be a component of a radiotelephone system. The microphone may be a component of a radiotelephone system. The microphone may be a directional microphone and where the direction from the microphone toward the directional loudspeaker is a low detection direction. The direction from the microphone toward a passenger location may be a high detection direction.

In another aspect, an audio system for a vehicle includes a plurality of audio channels; a directional loudspeaker; a first operating mode characterized by the directional loudspeaker radiating one of the audio channels; and a second operating mode characterized by the directional loudspeaker radiating a different one of the channels. One of the audio channels may be a center channel and the different one of the channels may be one of a right channel and a left channel. The second operating mode may be further characterized by the directional loudspeaker radiating the other of the right channel and the left channel. The directional loudspeaker may radiates the left channel directionally so that the direction toward a passenger position on the right is a high radiation direction and the directional loudspeaker may radiates the right channel directionally so that the direction toward a passenger position on the left is a high radiation direction. The directional loudspeaker may radiate the left channel directionally so that the direction toward the passenger position on the left is a low radiation direction and may radiate the right channel so that direction toward the passenger position on the right is a low radiation direction. The directional loudspeaker may be constructed and arranged so that the source of the center channel radiation appears to be a video display. The directional loudspeaker may radiate the center channel toward the video display so that the center channel radiation reflects off the video display. The first operating mode may be further characterized by the directional loudspeaker radiating the center channel so that a direction toward a front passenger position is a low radiation direction.

In another aspect, an audio system for a vehicle may include a plurality of audio channels and a plurality of directional loudspeakers. A method for operating the audio system may include alternatively radiating by one of the plurality of directional loudspeaker one of a first directional radiating pattern and a second directional radiating pattern. The radiating the first directional radiating pattern may include radiating the center channel by a first plurality of speakers and the radiating the second radiating pattern may include radiating the center channel by one of the directional loudspeakers, the one of the directional loudspeakers not included in the first plurality of loudspeakers. The method may further include alternatively radiating by a second of the plurality of directional loudspeaker one of the first directional radiating pattern and the second directional radiating pattern. The method for operating a vehicle audio system may further include selecting, by a user, the first radiating pattern or the second radiating pattern. The method for operating a vehicle audio system may further include automatically selecting, based on a sensed condition, the first radiating pattern or the second radiating pattern.

In another aspect, an audio system for a vehicle includes a directional loudspeaker mounted in a door of the vehicle. The directional loudspeaker may be a directional array. The audio system may further include a plurality of channels including a surround channel. The directional loudspeaker may be constructed and arranged to radiate directionally the surround channel so that the direction toward the front of the vehicle is a high radiation direction. The audio system may be constructed to radiate directionally the surround channel so that the direction toward the rear of the vehicle is a low radiation direction. The audio system may be constructed and arranged to radiate directionally another of the plurality of channels so that the direction toward the rear of the vehicle is a high radiation direction. The audio system may be constructed and arranged to radiate directionally the another of the plurality of channels so that the direction toward the front of the vehicle is a low radiation direction. The audio system may be constructed and arranged to radiate directionally another of the plurality of channels so that the direction toward the rear of the vehicle is a high radiation direction. The audio system may be constructed and arrange to alternatively radiate the surround channel directionally or omni-directionally.

The audio system may include a plurality of channels including a surround channel and the directional loudspeaker may be constructed and arranged to radiate the surround channel toward the front of the vehicle.

Other features, objects, and advantages will become apparent from the following detailed description, when read in connection with the following drawing, in which:

DETAILED DESCRIPTION

Figure 1:
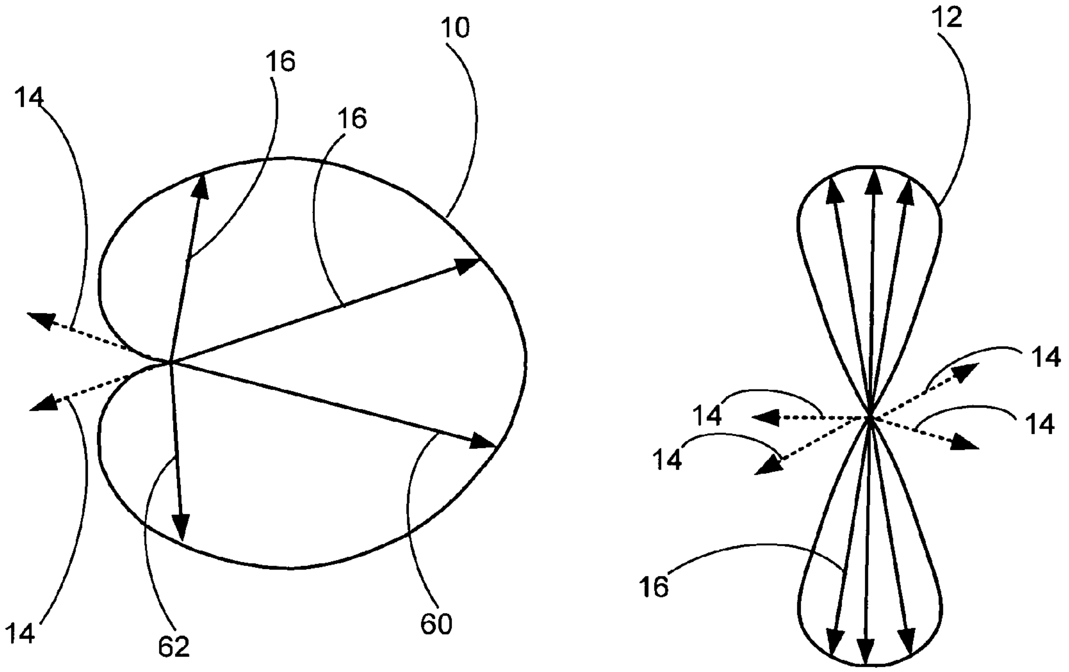
FIG. 1 shows examples of polar plots of directional loudspeakers.

Though some of the elements of several views of the drawing may be shown and described as discrete elements in a block diagram and are referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Some elements, such as signal lines, amplifiers, equalizers, signal processing circuitry and the like are not shown. Some of the examples described in this specification use as an example an audio system with five directional channels, such as a 5 or 5.1 channel system. The principles described in the specification can be applied to audio systems having fewer or more than five directional channels, such as 4.1, 6.1, 7.1 . . . channels. For simplicity "an audio signal representing the encoded audio information in channel y" will be referred to as "channel y audio signal" and "radiating acoustic energy corresponding to an audio signal in channel y" will be referred to as "radiating channel y." As used herein, "ahead of" means "closer to the front of the vehicle than" and "in back of" means "closer to the rear of the vehicle than." "Ahead of" and "in back of" may, but do not necessarily mean "directly in front of" or "directly in back of." "Laterally outside" means "closer to the nearest side of the vehicle than".

Directional loudspeakers are loudspeakers that have a radiation pattern in which more acoustic energy is radiated in some directions than in others. Directional arrays are directional loudspeakers that have multiple acoustic energy sources. In a directional array, over a range of frequencies in which the corresponding wavelengths are large relative to the spacing of the energy sources, the pressure waves radiated by the acoustic energy sources destructively interfere, so that the array radiates more or less energy in different directions depending on the degree of destructive interference that occurs. The directions in which relatively more acoustic energy is radiated, for example directions in which the sound pressure level is within 6 dB of (preferably between −6 dB and −4 dB, and ideally between −4 dB and −0 dB) the maximum sound pressure level (SPL) in any direction at points of equivalent distance from the directional loudspeaker will be referred to as "high radiation directions." The directions in which less acoustic energy is radiated, for example directions in which the SPL is a level at least −6 dB (preferably between −6 dB and −10 dB, and ideally greater than −10 dB, for example −20 dB) with respect to the maximum in any direction for points equidistant from the directional loudspeaker, will be referred to as "low radiation directions". In all of the figures, directional loudspeakers are shown as having two cone-type acoustic drivers. The directional loudspeakers may be some type of directional loudspeaker other than a multi-element loudspeaker. Directional arrays have at least two acoustic energy sources, and may have more than two. Increasing the number of acoustic energy sources increases the control over the radiation pattern of the directional loudspeaker, for example by permitting control over the radiation pattern in more than one plane. The directional loudspeakers in the figures show the location of the loudspeaker, but do not necessarily show the number of, or the orientation of, the acoustic energy sources. The number of and the orientation of the acoustic energy sources and signal processing necessary to produce directional radiation patterns may be done employing the techniques described in the Background section.

Directional characteristics of loudspeakers are typically displayed as polar plots, such as the polar plots of FIG. 1. Polar plot 10 represents the radiation directional characteristics of a directional loudspeaker, in this case a so-called "cardioid" pattern. Polar plot 12 represents the radiation directional characteristics of a second type of directional loudspeaker, in this case a dipole pattern. Polar plots 10 and 12 indicate a directional radiation pattern. The low radiation directions indicated by dotted lines 14 may be, but are not necessarily, "null directions." Null directions are indicated by vectors originating at the centroid of the acoustic energy sources and connecting points at which the local radiation is at a local minimum relative to other points equally spaced from the acoustic energy source. High radiation directions are indicated by solid lines 16. In the polar plots, the length of the vectors in the high radiation directions represents the relative amount of acoustic energy radiated in that direction. For example, in the cardioid polar pattern, more acoustic energy is radiated in direction 60 than in direction 62.

The vehicle audio systems described herein include directional loudspeakers that radiate more acoustic energy in some directions than in others. In most circumstances it is desirable that the directions in which more acoustic energy is radiated are high radiation directions (as described above) and that the directions in which less acoustic energy is radiated are low radiation directions (as described above). However, in most situations, some improvement over conventional audio systems can be obtained even if the direction in which more acoustic energy is radiated and the direction in which less acoustic energy is radiated are both high radiation directions. Situations which are particularly suited to the direction in which more acoustic energy is radiated and the direction in which less acoustic energy is radiated both being high radiation directions will be noted in the specification.

Figure 2A:
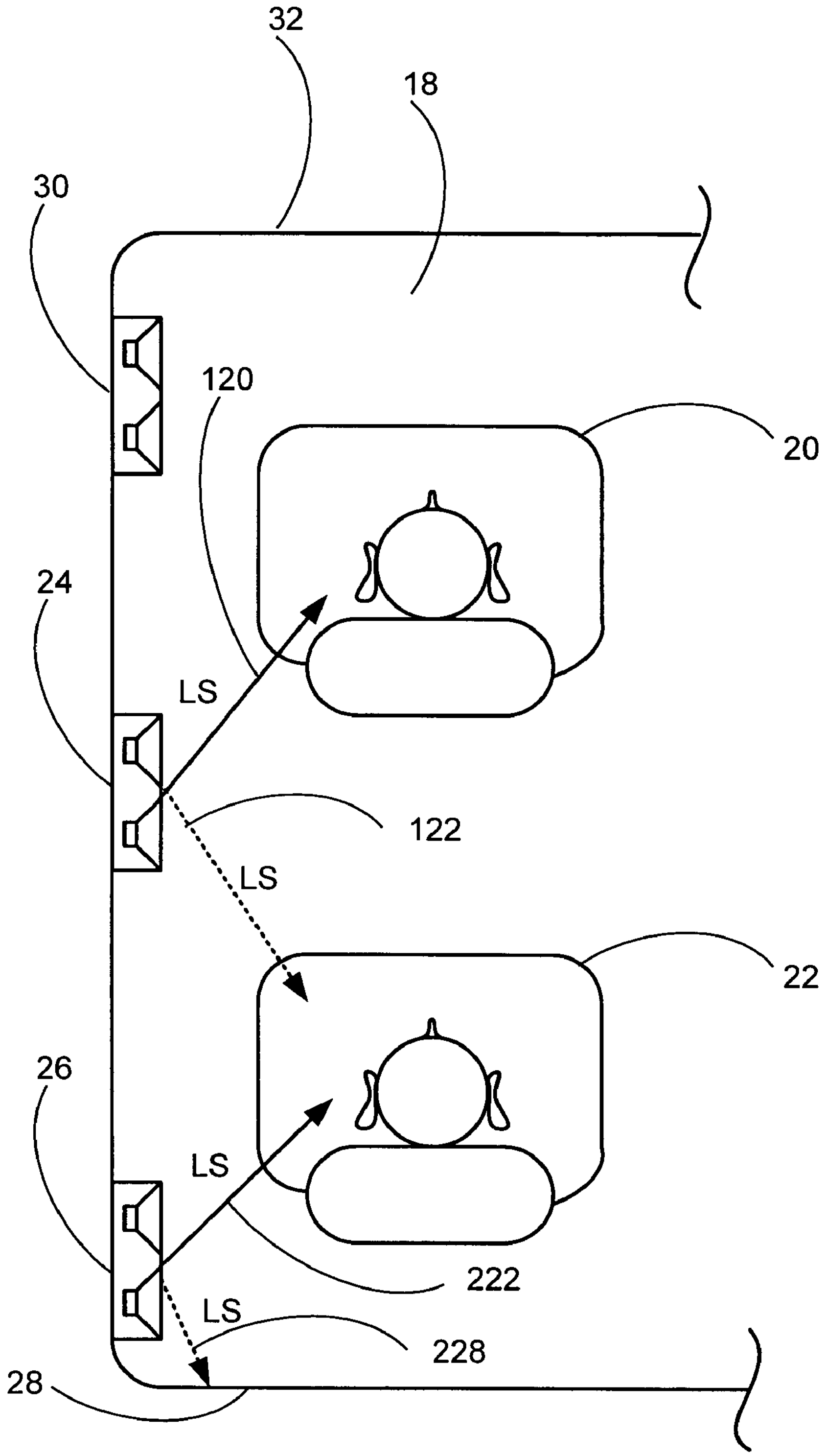
FIGS. 2A-2D are diagrammatic views of portions of a vehicle interior.

FIG. 2A shows a diagrammatic representation of a portion of a vehicle interior 18. In the vehicle interior are a front seat passenger position 20 and a rear seat passenger position 22. Mid-vehicle directional loudspeaker 24 is mounted in back of front passenger position 20 and ahead of rear passenger position 22 and preferably laterally outside front and rear passenger positions 20 and 22, for example in the rear door, in the B-pillar, in a seatback associated with a seat in passenger position 20 or in the headliner. In this figure and all other figures, the locations of the directional loudspeakers are designated by their position relative to the passenger positions, not by the exemplary structural elements mentioned. For example, the location of mid-vehicle directional loudspeaker 24 is not limited to being in the B-Pillar, the rear door, or a seat back. Rear directional loudspeaker 26 is mounted in back of and preferably laterally outside the rear passenger position 22, for example in the C-pillar, in the package shelf, or in the wall of a station wagon, van, minivan, or sport utility vehicle. Directional loudspeakers 24 and 26 are components of a sound system having at least one surround channel, in this example a left surround (LS) channel. There may also be a front directional loudspeaker 30 mounted ahead of and preferably laterally outside front seat passenger position 20, for example in the A-pillar, the dashboard, the footwell, or the front door. The figures show the directional characteristics of the directional loudspeakers in the horizontal plane. The directional loudspeaker may also cause directions having vertical components to be high radiation directions or low radiation directions. Directional loudspeakers are designed and constructed to radiate directionally so that a direction toward an occupants head is a high radiation direction or a low radiation direction. Hereinafter, the passenger positions shall be taken to include the head height of a person in the passenger position.

Mid-vehicle directional loudspeaker 24 is constructed and arranged to radiate directionally the LS channel so that direction 120 toward front seat passenger position 20 is a high radiation direction and so that direction 122 toward rear seat passenger position 22 is a low radiation direction. Rear directional loudspeaker 26 may be constructed and arranged to radiate directionally the LS channel so that direction 222 toward rear passenger position 22 is a high radiation direction and so that direction 228 toward the rear window 28 is a low radiation direction. Alternatively, rear directional loudspeaker 26 may be constructed and arranged so that direction 222 toward rear passenger position 22 is a low radiation direction and so that direction 228 toward rear window 26 is a high radiation direction. In other implementations, directional loudspeaker 26 and 30 may be replaced by conventional non-directional loudspeakers.

Figure 2B:
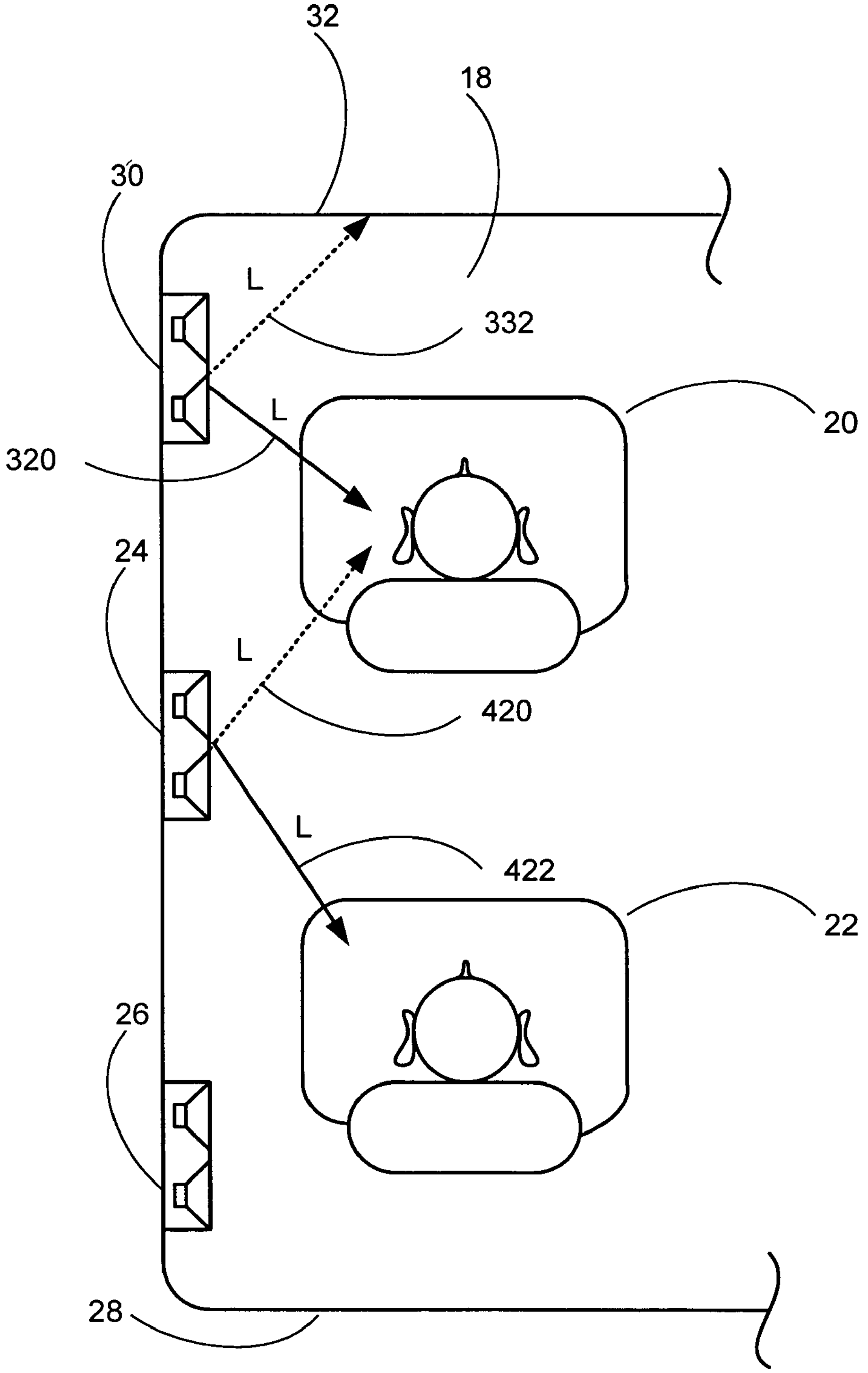

FIG. 2B also shows a diagrammatic representation of a vehicle interior 18. In the arrangement of FIG. 2B, mid-vehicle directional loudspeaker 24 radiates directionally an L (left) channel so that direction 422 toward rear passenger 22 is a high radiation direction as so that direction 420 toward front passenger position 20 is a low radiation direction. Front directional speaker 30 is constructed and arranged to radiate directionally the L channel so that direction 320 toward passenger position 20 is a high radiation direction and so that direction 332 toward windshield 32 is a low radiation direction.

Figure 2C:
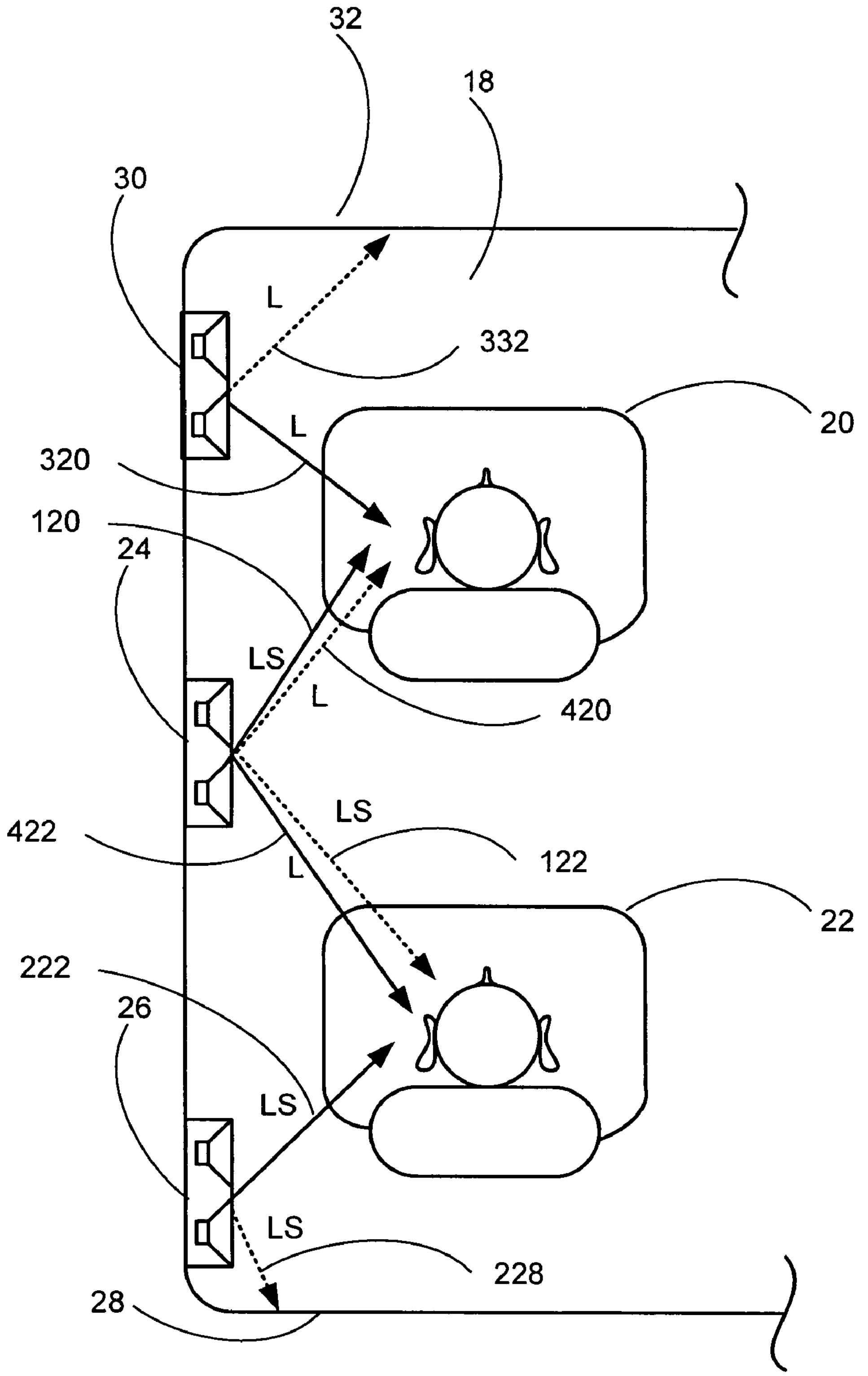

FIG. 2C is a diagrammatic representation of a vehicle interior 18 combining the arrangements of FIGS. 2A and 2B.

In the audio system of FIG. 2C loudspeaker 24 of FIG. 2C radiates more acoustic energy of one channel in a first direction than in a second direction, and simultaneously radiates more acoustic energy of a second channel in a third direction than in a fourth direction. In some implementations, the second direction is the same as the third direction or the first direction is the same as the fourth direction, or both. In other words, a single loudspeaker radiates two different audio signals in two different radiation patterns simultaneously. Techniques for doing this are described in one or more of the publications stated in the Background section. An occupant of one passenger position receives more acoustic energy corresponding to a first channel than acoustic energy corresponding to a second channel, and an occupant of a second passenger position, in back of or in front of the first passenger position, receives more acoustic energy corresponding to the second channel than acoustic energy corresponding to the first channel.

There are many advantages to the arrangements of FIGS. 2A-2C. The L channel is radiated directionally toward occupants of both front passenger position 20 and rear passenger position 22 from the front and to the left of the relative passenger location, and significantly less L channel is radiated toward occupants of either passenger position from the rear. The LS channel is radiated directionally toward occupants of both front passenger position 20 and rear passenger position 22 from the rear and to the left of the relative passenger location and significantly less LS channel is radiated toward occupants of either passenger position from the front. This provides a better acoustic image.

Figure 2D:
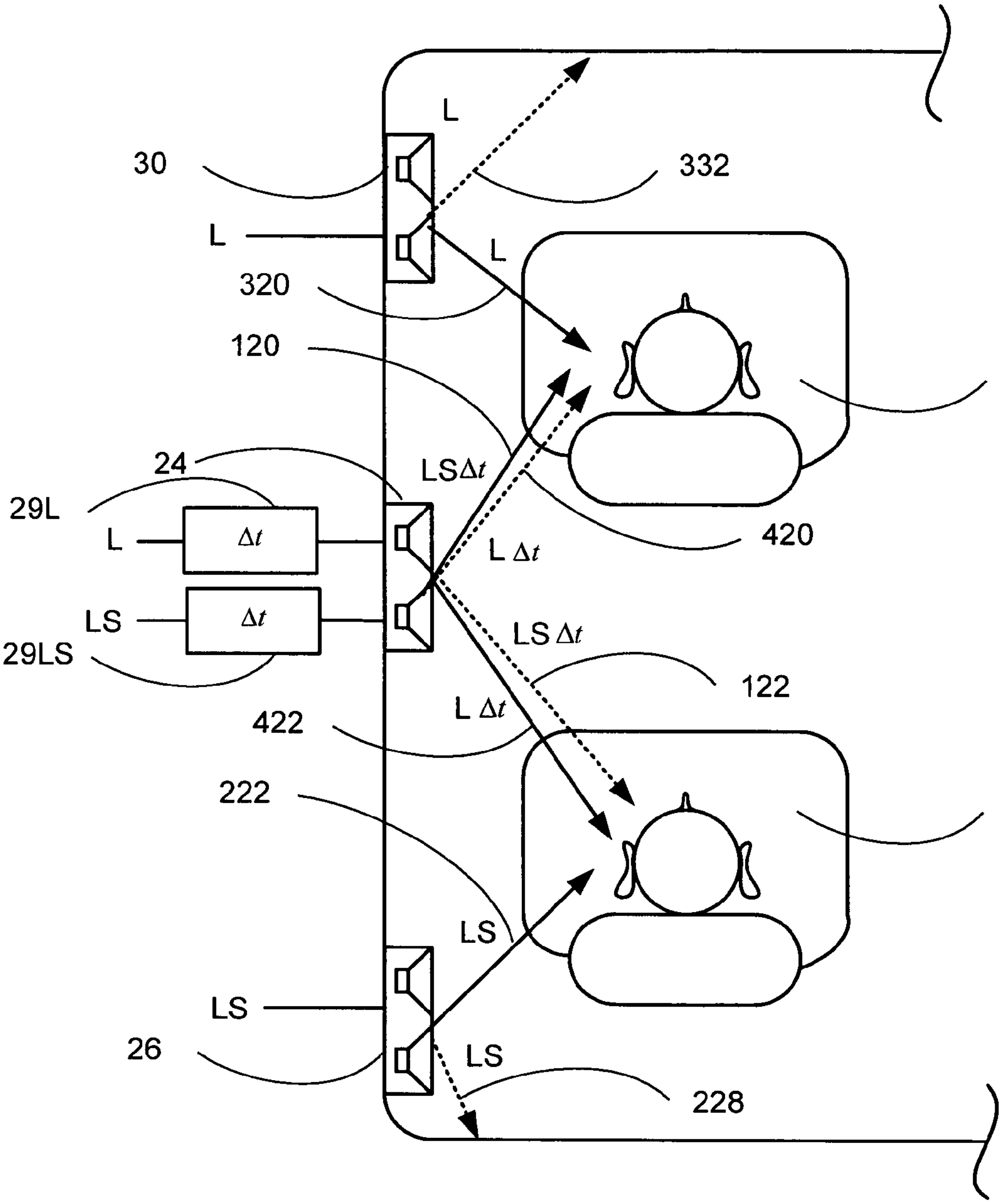

Referring to FIG. 2D, the acoustic image can be further improved by the use of delays, that is, delaying an audio signal applied to a first directional loudspeaker relative to the audio signal applied to a second loudspeaker, which may be a directional loudspeaker, so that the first directional loudspeaker radiates the audio signal after the second loudspeaker. For example, the audio system may have a delay 29L to delay the L signal to mid-vehicle directional loudspeaker 24 relative to the L signal to front directional loudspeaker 30. The listener in front passenger position 20 hears the L channel radiation from the front directional loudspeaker 30 before hearing the radiation from the mid-vehicle directional loudspeaker 24. Due to the precedence effect, referred to also as the Haas effect, hearing the L channel radiation from the front directional loudspeaker 30 before hearing the L channel radiation from mid-vehicle directional loudspeaker 24 causes the listener in front passenger position 20 to perceive the source of the L signal radiation as being the front directional speaker. Since the occupant of front passenger position 20 tends to localize on front directional loudspeaker 30 as the source of the L channel radiation due to receiving more L radiation from front directional loudspeaker 30 than from mid-vehicle directional loudspeaker 24, the precedence provides a time cue that supplements the magnitude cue, further enhancing the acoustic image.

Similarly, the audio system may have a delay 29LS to delay the LS signal to mid-vehicle directional loudspeaker 24 relative to the LS signal to rear directional loudspeaker 26 so that the precedence effect supplements the magnitude cue in causing the occupant of rear passenger position 22 to perceive the source of the LS radiation as being rear directional loudspeaker 26. The amount of delay can be set such that the first arrival of LS radiation at front listening passenger position 20 is from rear directional loudspeaker 26. This increases the sense of spaciousness for the occupant of front passenger position 20.

A further advantage of the arrangements of FIGS. 2A-2C is that the early reflections from the rear window 28 and the windshield 32 have less magnitude than they would if conventional loudspeakers placed similarly to front directional loudspeaker 30 and rear directional loudspeaker 26. Early reflections are reflections for which the path lengths to a listening space are not significantly longer that the path lengths of the direct radiation. Early reflections are undesirable because they negatively affect the frequency response of the speaker. Frequency response anomalies resulting from early reflections are difficult to remedy by conventional methods, such as equalization, because the anomalies occur at different frequencies at different locations in the vehicle interior. An alternative implementation having a similar advantage can be obtained by arranging a radiation pattern so that direction 222 of FIGS. 2A and 2C toward rear passenger position 22 is a low radiation direction and so that direction 228 toward the reflective surface is a high radiation direction. With this arrangement, the abovementioned frequency response anomalies are also reduced, and the occupant of rear seat passenger position 22 would tend to localize the LS channel source as the rear window 28.

Figure 3A:
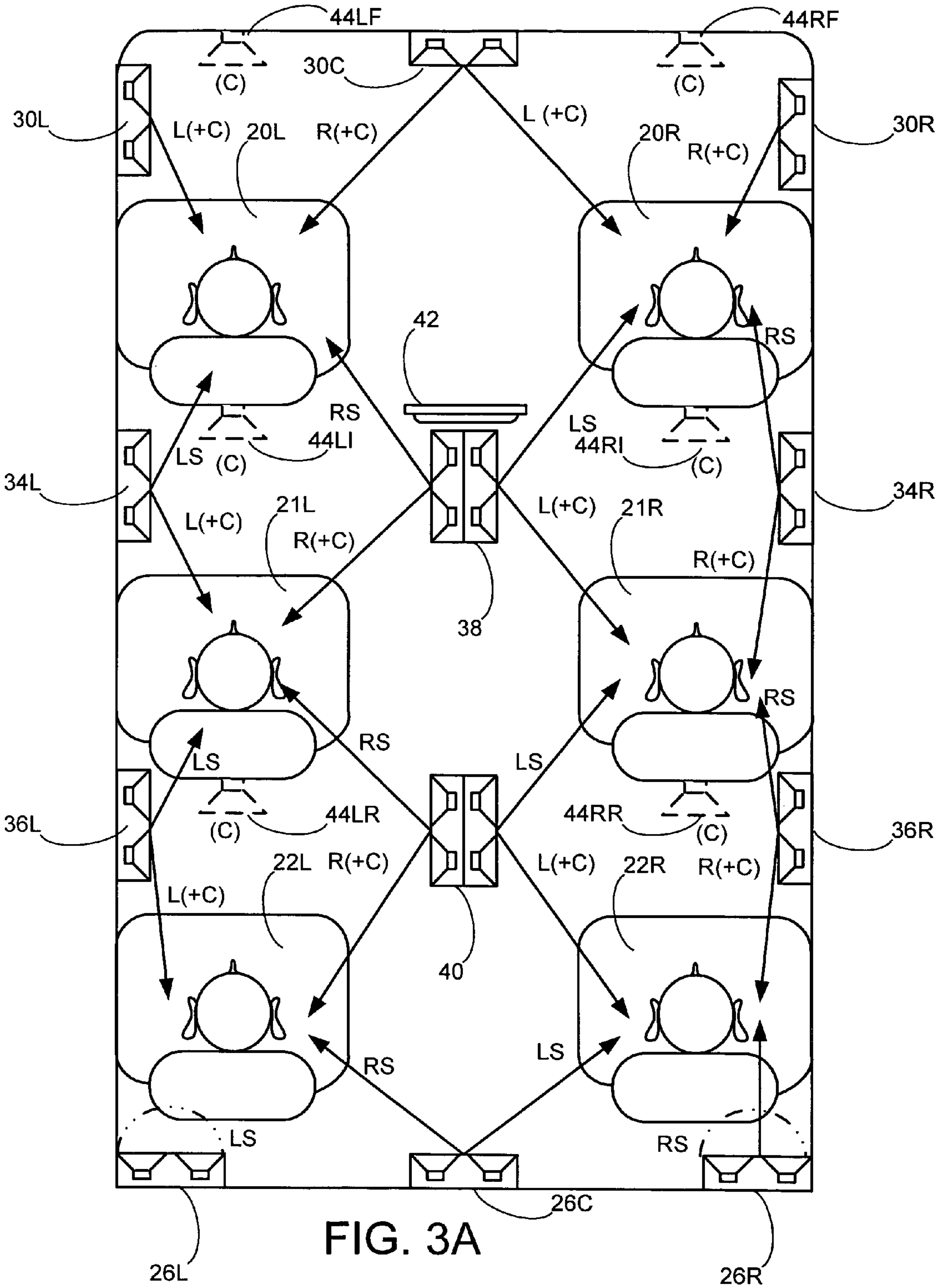
FIGS. 3A-3D are diagrammatic views of a vehicle interior.
Figure 3B:
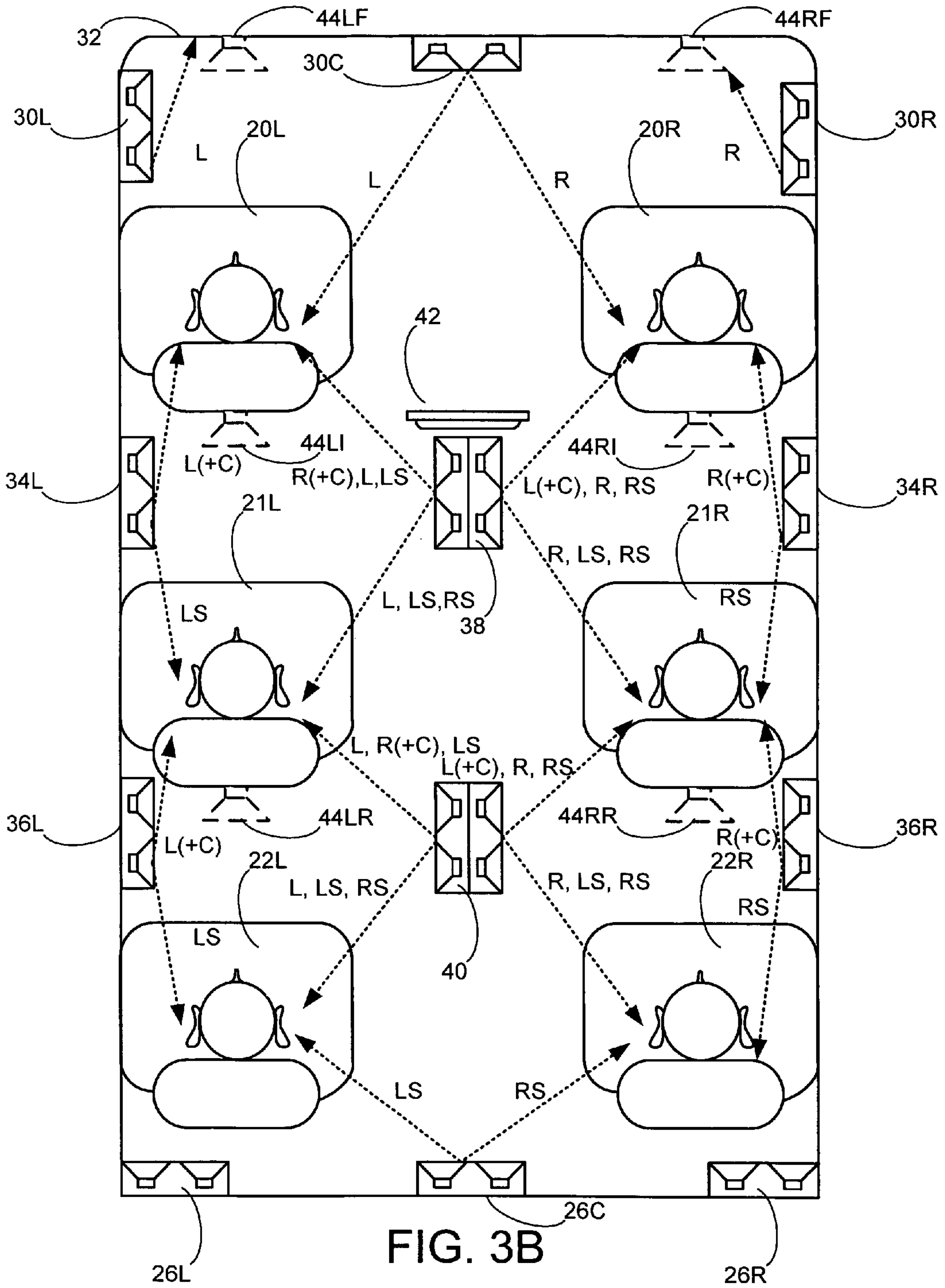

Referring to FIGS. 3A and 3B, there are shown diagrammatic representations of a vehicle interior with an audio system. In this figure, the vehicle has more than two rows of seating, for example a van, minivan, or sport utility vehicle. In the vehicle interior are a plurality of passenger positions, in this case left and right front passenger positions 20L and 20R, left and right intermediate passenger positions 21L and 21R, and left and right rear passenger positions 22L and 22R. Left and right front directional loudspeakers 30L and 30R are mounted ahead of and preferably laterally outside front passenger positions 20L and 20R, for example in the front doors or in the dashboard. Left and right forward mid-vehicle directional loudspeakers 34L and 34R are mounted in back of and preferably laterally outside front passenger positions 20L and 20R and ahead of and preferably laterally outside intermediate passenger positions 21L and 21R, for example in the rear door or the headliner. Left and right rearward mid-vehicle directional loudspeakers 36L and 36R are mounted in back of and preferably laterally outside intermediate passenger positions 21L and 21R and ahead of and preferably laterally outside rear passenger positions 22L and 22R, for example in the sidewall or the in the headliner. Rear directional loudspeakers 26L and 26R are mounted in back of rear passenger positions 22L and 22R and may be mounted laterally outside rear passenger positions 22L and 22R, for example in the sidewall, in the headliner, or in the tailgate. Center front directional loudspeaker 30C is mounted ahead of and between front passenger positions 20L and 20R, for example in the dashboard, in the rear view mirror assembly, a floor console or in the headliner. Center rear directional loudspeaker 26C is mounted between and in back of rear passenger positions 22L and 22R, for example in the tailgate or in the headliner. Forward mid-vehicle directional loudspeaker 38 is mounted in back of front passenger positions 20L and 20R, and ahead of and between intermediate passenger positions 21L and 21R, for example in a console or in the headliner. Rearward mid-vehicle directional loudspeaker 40 is mounted in back of intermediate passenger positions 21L and 21R and between and ahead of rear passenger positions 22L and 22R, for example in a console or in the headliner. Video display 42 is mounted so that the screen is visible to the intermediate and rear passenger positions, for example on the rear surface of a console or in the headliner. Rearward mid-vehicle directional loudspeaker 40 may be mounted in any suitable structural element and is not limited to the rear surface of a console or in the headliner. Forward mid-vehicle directional loudspeaker 38 and rearward mid-vehicle directional loudspeaker 40 both radiate directionally four different channels, L, R, LS, and RS. In other implementations, forward mid-vehicle directional loudspeaker 38 and rearward mid-vehicle loudspeaker 40 may also radiate a center channel C. Forward and rearward mid-vehicle loudspeakers 38 and 40 may be implemented as two separate directional loudspeakers or as a directional loudspeaker having more than two elements, such as four acoustic drivers.

FIG. 3A shows high radiation directions with the audio system operating in a first mode, which will be called a "music mode." Left front directional loudspeaker 30L radiates directionally the left channel so that the direction toward front left passenger position 20L is a high radiation direction. Center front directional loudspeaker 30C radiates directionally the right channel so that the direction toward left front passenger position 20L is a high radiation direction; and radiates directionally the left channel so that the direction toward the right front passenger position 20R is a high radiation direction. Right front directional loudspeaker 30R radiates directionally the right channel so that the direction toward right front passenger position 20R is a high radiation direction. Left forward mid-vehicle directional loudspeaker 34L radiates directionally the left surround channel so that the direction toward left front passenger position 20L is a high radiation direction; and radiates directionally the left channel so that the direction toward left intermediate passenger position 21L is a high radiation direction. Forward mid-vehicle multiple element directional loudspeaker 38 radiates directionally the right surround channel so that the direction toward left front passenger position 20L is a high radiation direction; radiates directionally the left surround channel so that the direction toward right front passenger position 20R is a high radiation direction; radiates directionally the right channel so that the direction toward left intermediate passenger position 21L is a high radiation direction; and radiates directionally the left channel so that the direction toward right intermediate passenger position 21R is a high radiation direction. Right forward mid-vehicle directional loudspeaker 34R radiates directionally the right surround channel so that the direction toward right front passenger position 20R is a high radiation direction; and radiates directionally the right channel signal so that the direction toward right intermediate passenger position 21R is a high radiation direction. Left rearward mid-vehicle directional loudspeaker 36L radiates directionally the left surround channel so that the direction toward left intermediate passenger position 21L is a high radiation direction and radiates directionally the left channel so that the direction toward left rear passenger position 22L is a high radiation direction. Rearward mid-vehicle directional loudspeaker 40 radiates directionally the right surround channel so that the direction toward left intermediate passenger position 21L is a high radiation direction; radiates directionally the left surround channel so that the direction toward right intermediate passenger position 21R is a high radiation direction; radiates directionally the right channel so that the direction toward left rear passenger position 22L is a high radiation direction; and radiates directionally the left channel so that the direction toward right rear passenger position 22R is a high radiation direction. Right rearward mid-vehicle directional loudspeaker 36R radiates directionally the right surround channel so that the direction toward right intermediate passenger position 21R is a high radiation direction and radiates directionally the right channel so that the direction toward right rear passenger position 22R is a high radiation direction. If placed as shown, left rear directional loudspeaker 26L may radiate left surround channel omni-directionally as shown. If left rear directional speaker 26L is placed where there might be early reflections, such as the sidewall, left rear directional loudspeaker 26L may radiate the LS channel directionally so that the direction toward rear passenger position 22L is a high radiation direction. Center rear directional loudspeaker 26C radiates directionally the right surround channel so that the direction toward left rear passenger position 22L is a high radiation direction and radiates directionally the left surround channel so that the direction toward right rear passenger position 22R is a high radiation direction. If placed as shown, right rear directional loudspeaker 26R may radiate directionally the right surround channel omni directionally as shown. If right rear directional speaker 26R is placed where there might be early reflections, such as the sidewall, right rear directional loudspeaker 26R may radiate the right surround channel directionally so that the direction toward right rear passenger position 22R is a high radiation direction.

Some audio material may have center channel information. To radiate center channel information in music mode, center channel speakers (which may or may not be directional speakers) such as 44LF, 44RF, 44LI, 44RI, 44LR, and 44RR could be used, as indicated by the parenthetical expressions in FIG. 3A. Alternatively, the center channel could be mixed with the left and right channels, as indicated by the parenthetical expressions in FIG. 3A.

FIG. 3B shows low radiation directions of the audio system of FIG. 3A, operating in music mode. Left front directional loudspeaker 30L radiates directionally the left channel so that the direction toward the windshield 32 is a low radiation direction. Center front directional loudspeaker 30C radiates directionally the left channel so that the direction toward left front passenger position 20L is a low radiation direction and radiates directionally the right channel so that the direction toward right front passenger position 20R is a low radiation direction. Right front directional loudspeaker 30R radiates directionally the right channel so that the direction toward windshield 32 is a low radiation direction. Left forward mid-vehicle directional loudspeaker 34L radiates directionally the left channel so that the direction toward left front passenger position 20L is a low radiation direction and radiates directionally the left surround channel so that the direction toward left intermediate passenger position 21L is a low radiation direction. Forward mid-vehicle directional loudspeaker 38 radiates directionally the right channel, the left channel, and the left surround channels so that the direction toward left front passenger position 20L is a low radiation direction; radiates directionally the left channel, the right channel, and the right surround channel so that the direction toward right front passenger position 20R is a low radiation direction; radiates directionally the right surround channel, the left surround channel, and the left channel so that the direction toward left intermediate passenger position 21L is a low radiation direction; and radiates directionally the left surround channel, the left channel, and the right surround channel so that the direction toward right intermediate passenger position 21R is a low radiation direction. Right forward mid-vehicle directional loudspeaker 34R radiates directionally the right channel so that the direction toward right front passenger position 20R is a low radiation direction and radiates directionally the right surround channel so that the direction toward right intermediate passenger position 21R is a low radiation direction. Left rearward mid-vehicle directional loudspeaker 36L radiates directionally the left channel so that the direction toward left intermediate passenger position 21L is a low radiation direction and radiates directionally the left surround channel so that the direction toward left rear passenger position 22L is a low radiation direction. Rearward mid-vehicle directional loudspeaker 40 radiates directionally the right channel, the left channel, and the left surround channel so that the direction toward left intermediate passenger position 21L is a low radiation direction; radiates directionally the left channel, the right channel, and the right surround channel so that the direction toward right intermediate passenger position 21R is a low radiation direction; radiates directionally the right surround channel, the left channel, and the left surround channel so that the direction toward left rear passenger position 22L is a low radiation direction; and radiates directionally the left surround channel, the right channel and the right surround channel so that the direction toward right rear passenger position 22R is a low radiation direction. Right rearward mid-vehicle directional loudspeaker 36R radiates directionally the right channel so that the direction toward right intermediate passenger position 21R is a low radiation direction and radiates directionally the right surround channel so that the direction toward right rear passenger position 22R is a low radiation direction. Center rear directional loudspeaker 26C radiates directionally the LS channel so that the direction toward left rear passenger position 22L is a low radiation direction and radiates directionally the RS channel so that the direction toward right rear passenger position 22R is a low radiation direction. If one or more of rear directional loudspeakers 26L, 26C, or 26R are positioned so that radiation is reflected off a reflective surface, such as a windshield or window, the directional loudspeaker may radiate directionally so that the direction toward the reflective surface(s) is a low radiation direction, not identified in this view. If there is center channel information in music mode, the center channel may be mixed with the left and right channels, as indicated by the parenthetical expressions in FIG. 3A. In that instance, front mid-vehicle directional loudspeaker 38 radiates directionally the center channel so that the direction toward left front passenger position 20L is a low radiation direction and radiates directionally the center channel so that the direction toward right front passenger position 20R is a low radiation direction; rear mid-vehicle directional loudspeaker 40 radiates directionally the center channel so that the direction toward left intermediate passenger position 21L is low radiation direction, and radiates directionally the center channels so that the direction toward right intermediate passenger position 21R is a low radiation direction; left forward mid-vehicle directional loudspeaker 34L radiates directionally the center channel so that the direction toward left front passenger position 20L is a low radiation direction; right forward mid-vehicle directional loudspeaker 34R radiates directionally the center channel so that the direction toward right front passenger position 20R is a low radiation direction; left rearward mid-vehicle directional loudspeaker 36L radiates directionally the center channel so that the direction toward left intermediate passenger position 21L is a low radiation direction; right rearward mid-vehicle directional loudspeaker 36R radiates directionally the center channel so that the direction toward right intermediate passenger position 21R is a low radiation direction.

Other implementations may have other combinations of directional and non-directional speakers or may not have all of the elements of FIG. 3A. For example, loudspeakers 34L, 34R, 36L, and 36R may be directional as shown, and some or all of the other directional loudspeakers of FIG. 3A may be replaced by conventional omni-directional loudspeakers. Radiating omni-directionally is more efficient than radiating directionally because no acoustic energy is lost to destructive interference. In an implementation not having center rear directional loudspeaker 26C, rear directional loudspeaker 26L may be configured to radiate the LS channel so that more acoustic energy is radiated toward passenger position 22R is than is radiated in the direction toward passenger position 22L; and rear directional loudspeaker 26R may be configured to radiate the RS channel so that more acoustic energy is radiated in the direction toward passenger position 22L than is radiated in the direction toward passenger position 22R. In this implementation, it is permissible or even preferable if the direction toward passenger positions 22L and 22R are both high radiation directions, so long as less acoustic energy is radiated toward the nearer passenger position than is radiated toward the farther passenger position; a difference of 3 or 4 dB is sufficient for a desirable result. The radiation pattern offsets the proximity of rear loudspeakers 26L and 26R to rear seating locations 22L and 22R, respectively, so that passengers in rear seating locations 22L and 22R hear approximately equal LS and RS channel radiation. Similarly, in a configuration not having forward mid-vehicle directional loudspeaker 38 or in which forward mid-vehicle directional loudspeaker 38 is not used to radiate surround channels, left forward mid-vehicle directional loudspeaker 34L may be configured to radiate the LS channel so that more acoustic energy is radiated toward right front seating location 20R than toward left front seating location 20L; and right forward mid-vehicle directional loudspeakers 34R may be configured to radiate the RS channel so that more acoustic energy is radiated toward left front seating location 20L than toward right front seating location 20R. Also, in a configuration not having rear mid-vehicle directional loudspeaker 40 or in which rear mid-vehicle directional loudspeaker 40 is not used to radiate surround channels, left rear mid-vehicle directional loudspeaker 36L may be configured to radiate the LS channel so that more acoustic energy is radiated toward right intermediate seating location 21R than toward left intermediate seating location 21L; and right rear mid-vehicle directional loudspeaker 36R may be configured to radiate the RS channel so that more acoustic energy is radiated toward left intermediate seating location 21L than toward right intermediate seating location 20R. Forward mid-vehicle directional loudspeaker 38 and rear mid-vehicle directional loudspeaker 40 may be configured to radiate the LS and RS channels forward, as in FIG. 3A and to radiate a center channel rearward.

An audio system according to FIGS. 3A and 3B is advantageous because the acoustic image at each passenger position may be better balanced left/right and fore/aft; because there may be reduced left and left surround channel radiation from sound sources to the right of each passenger position and correspondingly reduced right and right surround channel radiation from sound sources to the left of each passenger position; because there may be reduced left and right channel radiation from sound sources to the rear of each passenger position and correspondingly reduced left surround channel and right surround channel radiation from sound sources ahead of each passenger position; because there are reduced early reflections; and because the sound fields for each of the passenger positions are very similar, so equalization patterns may not need to be highly position dependent.

Figure 3C:
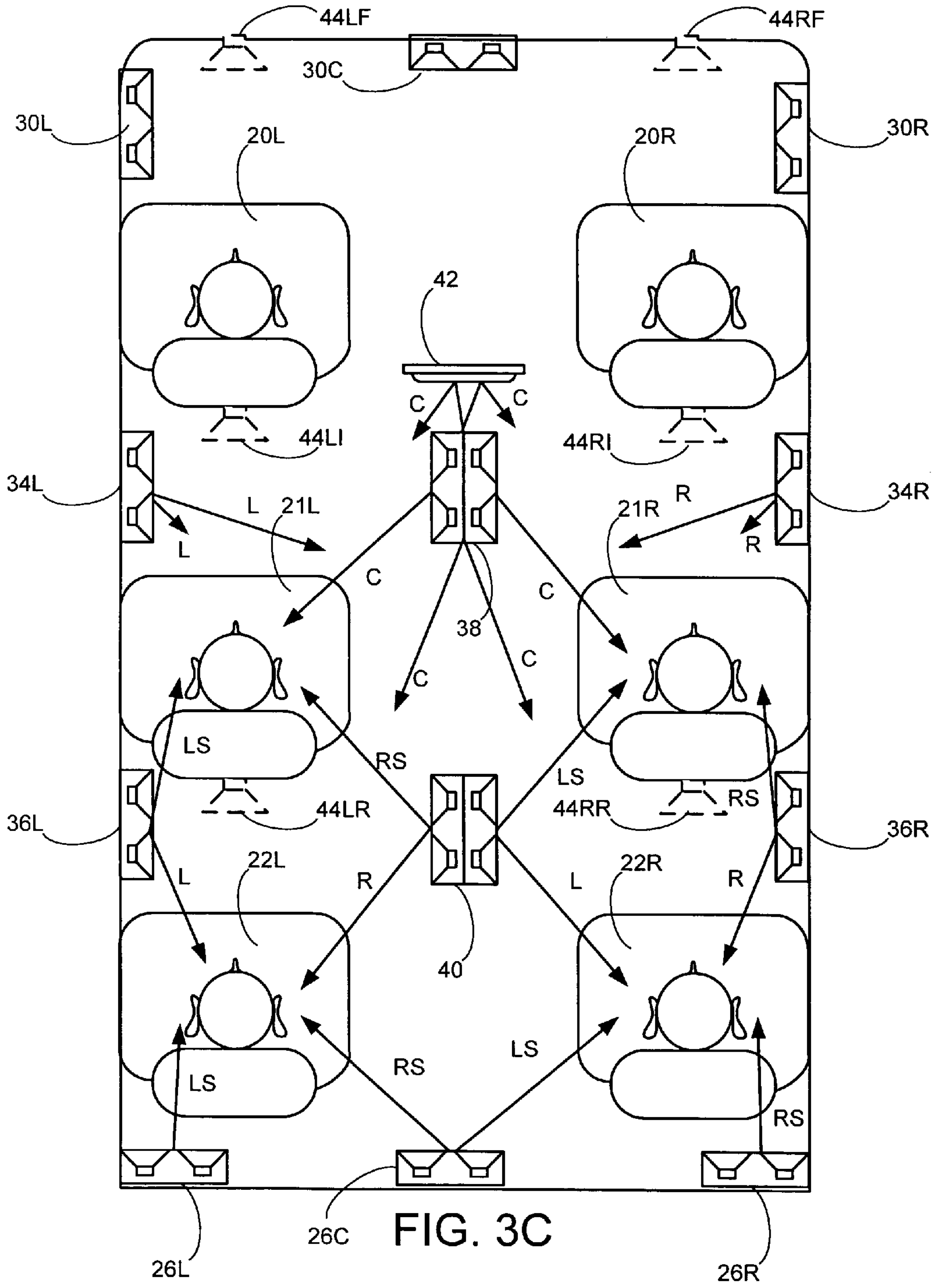
Figure 3D:
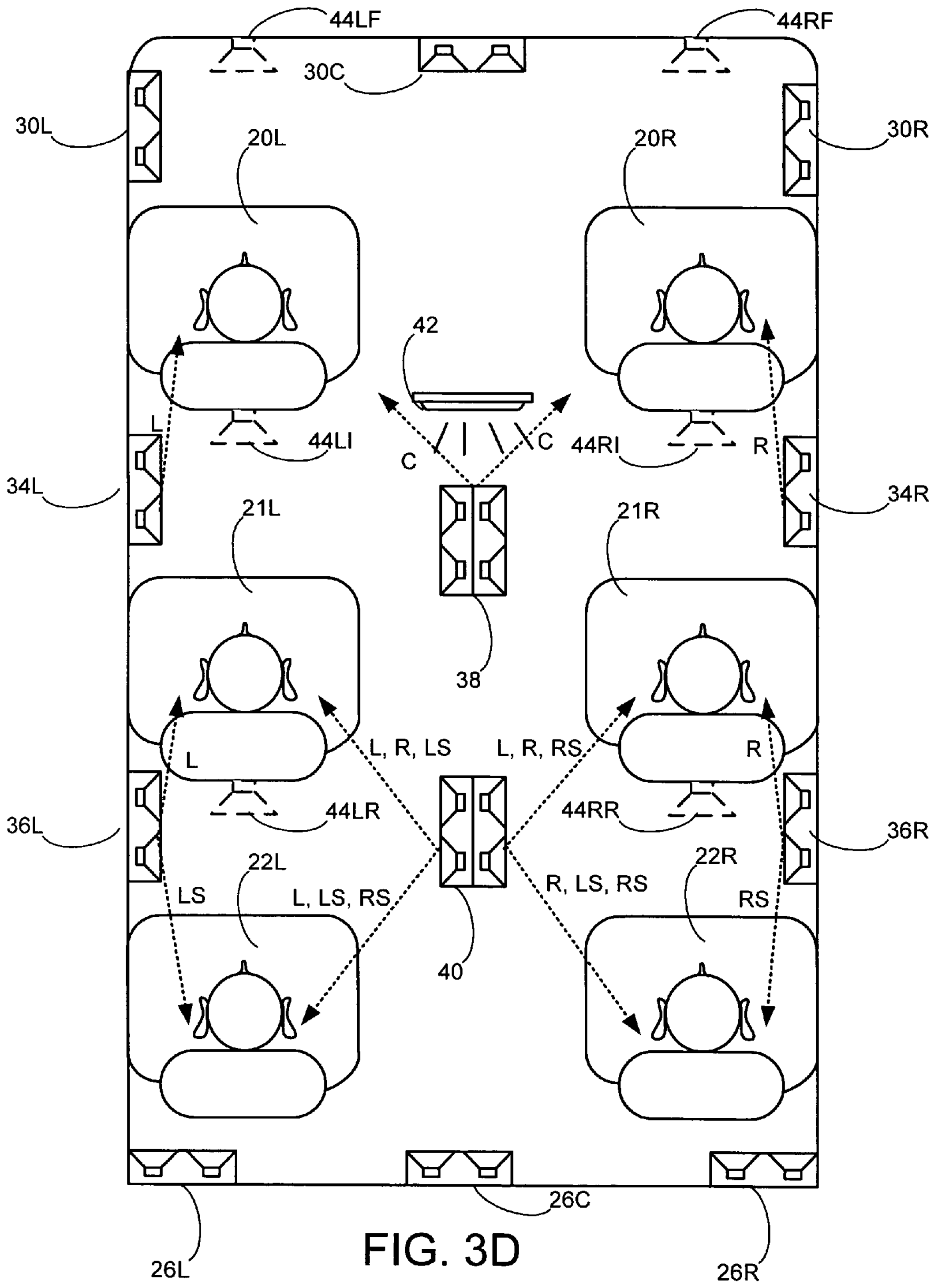

Referring to FIGS. 3C and 3D, there is shown the audio system of FIGS. 3A and 3B operating in a different mode, called "movie mode". In FIGS. 3C and 3D, a video image, for example the video portion of a DVD, is displayed on the screen of video display 42. In the arrangement of FIG. 3C, left front directional loudspeaker 30L, center front directional loudspeaker 30C and right front directional loudspeaker 30R radiate nothing, as may center channel speakers 44LF, 44RF, 44LI, 44RI, 44LR and 44RR, if present. Alternatively, one or more of directional loudspeakers 30L, 30C, 30R, and center channel speakers 44LF, 44RF, 44LI, 44RI, 44LR and 44RR, if present, may radiate low frequency radiation omni-directionally or center channel loudspeakers 44LI, 44RI, 44LR, and 44RR, if present, may radiate the center channel. Left forward mid-vehicle directional loudspeaker 34L radiates directionally the left channel so that the direction toward right intermediate passenger position 21R is a high radiation direction and preferably so that more acoustic energy is radiated toward right intermediate passenger position 21R than is radiated toward left intermediate passenger position 21L as indicated by the length of the directional arrows. It is permissible or even preferable that the direction toward both intermediate passenger positions 21L and 21R both be high radiation directions so long as less acoustic energy is radiated toward the nearer passenger position than is radiated toward the farther passenger position; a difference of 3 or 4 dB is sufficient for a desirable result. The radiation pattern offsets the proximity of rear loudspeaker 34L to intermediate seating locations 21L, so that passengers in intermediate seating locations 21L and 21R hear approximately equal L channel radiation. Forward mid-vehicle directional loudspeaker 38 radiates directionally the center channel so that the direction toward intermediate passenger positions 21L and 21R are high radiation directions and so that the direction toward rear passenger positions 22L and 22R are high radiation directions. Alternatively, or additionally, the forward mid-vehicle directional loudspeaker 38 can radiate directionally the center channel so that the direction toward the display 42 is a high radiation direction so that, as indicated in FIG. 3C, the center channel radiation reflects off the display 42 and the source of the center channel appears to be the display. Alternatively, the center channel may be radiated using the techniques described in U.S. patent application Ser. No. 10/838,759. Right forward mid-vehicle directional loudspeaker 34R radiates directionally the right channel so that the direction toward left intermediate passenger position 21L is a high radiation direction and preferably so that more acoustic energy is radiated toward left intermediate passenger position 21L than is radiated toward right intermediate passenger position 21R as indicated by the length of the directional arrows. It is permissible or even preferable that the direction toward both intermediate passenger positions 21L and 21R both be high radiation directions so long as less acoustic energy is radiated toward the nearer passenger position than is radiated toward the farther passenger position; a difference of 3 or 4 dB is sufficient for a desirable result. The radiation pattern offsets the proximity of rear loudspeaker 34R to intermediate seating locations 21R, so that passengers in intermediate seating locations 21L and 21R hear approximately equal R channel radiation. Left rearward mid-vehicle directional loudspeaker 36L radiates directionally the left surround channel so that the direction toward left intermediate passenger position 21L is a high radiation direction and radiates directionally the left channel so that the direction toward left rear passenger position 22L is a high radiation direction Rearward mid-vehicle directional loudspeaker 40 radiates directionally the right surround channel so that the direction toward left intermediate passenger position 21L is a high radiation direction; radiates directionally the left surround channel so that the direction toward right intermediate passenger position 21R is a high radiation direction; radiates directionally the right channel so that the direction toward left rear passenger position 22L is a high radiation direction; and radiates directionally the left channel so that the direction toward right rear passenger position 22R is a high radiation direction. Rearward mid-vehicle directional loudspeaker may also radiate the center channel. Right rearward mid-vehicle directional loudspeaker 36R radiates directionally the right channel so that the direction toward right rear passenger position 22R is a high radiation direction and radiates directionally the right surround channel so that the direction toward right intermediate passenger position 21R is a high radiation direction. Left rear directional loudspeaker 26L radiates directionally the left surround channel so that the direction toward left rear passenger position 22L is a high radiation direction. Center rear directional loudspeaker 26C radiates directionally the right surround channel so that the direction toward left rear passenger position 22L is a high radiation direction and radiates directionally the left surround channel so that the direction toward right rear passenger position 22R is a high radiation direction. Right rear directional loudspeaker 26R radiates directionally the right surround channel so that the direction toward right rear passenger position 22R is a high radiation direction.

FIG. 3D shows the low radiation directions of the audio system operating in the mode of FIG. 3C. Left forward intermediate directional loudspeaker 34L radiates directionally the left channel so that the direction toward the front of the vehicle passenger compartment is a low radiation direction. Forward mid-vehicle directional loudspeaker 38 radiates directionally the center channel so that the directions toward front seating locations 20L and 20R are low radiation directions. Right forward intermediate directional loudspeaker 34R radiates directionally the right channel so that the direction toward the front of the passenger compartment is a low radiation direction. Left rearward mid-vehicle directional loudspeaker 36L radiates directionally the left channel so that the direction toward left intermediate passenger position 21L is a low radiation direction and radiates directionally the left surround channel so that the direction toward left rear passenger position 22L is a low radiation direction. Rearward mid-vehicle directional loudspeaker 40 radiates directionally the right channel, the left channel, and the left surround channel so that the direction toward passenger position 21L is a low radiation direction; radiates directionally the left channel, the right channel, and the right surround channel so that the direction toward passenger position 21R is a low radiation direction; radiates directionally the left channel, the left surround channel, and the right surround channel so that the direction towards left rear passenger position 22L is a low radiation direction; and radiates directionally the right channel, the left surround channel, and the right surround channel so that the direction toward right rear passenger position 22R is a low radiation direction. Right rearward mid-vehicle directional loudspeaker 36R radiates directionally the right channel so that the direction toward right intermediate passenger position 21R is a low radiation direction and radiates directionally the right surround channel so that the direction toward right rear passenger position 22R is a low radiation direction. If one or more of rear directional loudspeakers 26L, 26C, or 26R are near reflective surfaces, the directional loudspeaker may radiate directionally so that the direction toward the reflective surface(s), not identified in this view, is a low radiation direction. As in the music mode, in implementations not having middle rear directional loudspeaker 26C, to achieve better balance, the left rear directional loudspeaker 26L may be configured so that the direction toward left rear passenger position 22L is a low radiation direction and so that the direction toward right rear passenger position 22R is a high radiation direction; and the right rear directional loudspeaker 26R may be configured so that the direction toward right rear passenger position 22R is a low radiation direction and so that the direction toward left rear passenger position 22R is a high radiation direction.

An audio system operating according to FIGS. 3C and 3D has the same advantages as an audio system operating according to FIGS. 3A and 3B. There is reduced left and right channel radiation from sound sources to the rear of each passenger position and correspondingly reduced left surround and right surround channel radiation from sound sources ahead of each passenger position, which results in better fore/aft balance. In "video mode" there may be better left/right balance at the intermediate passenger locations because the directional radiation pattern may offset the closer proximity of the intermediate passenger locations to the directional loudspeakers. There are reduced early reflections, which improves the frequency response. In addition, an audio system operating as in FIGS. 3C and 3D provides a realistic placement of the apparent source of the center channel, which in video applications is intended to appear to come from the video image. Still further, passengers in the intermediate and rear passenger positions can enjoy the audio portion of a video presentation at a relatively high volume without disturbing or distracting the driver or front seat passenger. It is not necessary to implement all of the directional loudspeakers of FIGS. 3A-3D to obtain improved performance over conventional vehicle audio systems.

Delays, as described above in the discussion of FIG. 2D, can also be used in the implementations of FIGS. 3A-3D to supplement the radiation pattern to cause better localization.

An audio system may have the capability of operating in both the mode shown in FIGS. 3A and 3B and in the mode shown in FIGS. 3C and 3D, and may also have circuitry for selecting between the available modes of operation. The circuitry could be manual, for example a switch, or could be automatic, for example including circuitry for sensing if a media being played has video information, and if there is video information automatically selecting the mode of FIGS. 3C and 3D.

The diagrams of FIGS. 2A-2D and FIGS. 3A-3D illustrate the directional loudspeakers operating in the horizontal plane. In actual implementations the operation may have a vertical component as well. For example, if a directional loudspeaker is mounted in the headliner, the radiation and the radiation pattern may be directed downwards as well as preferably laterally.

Figure 4:
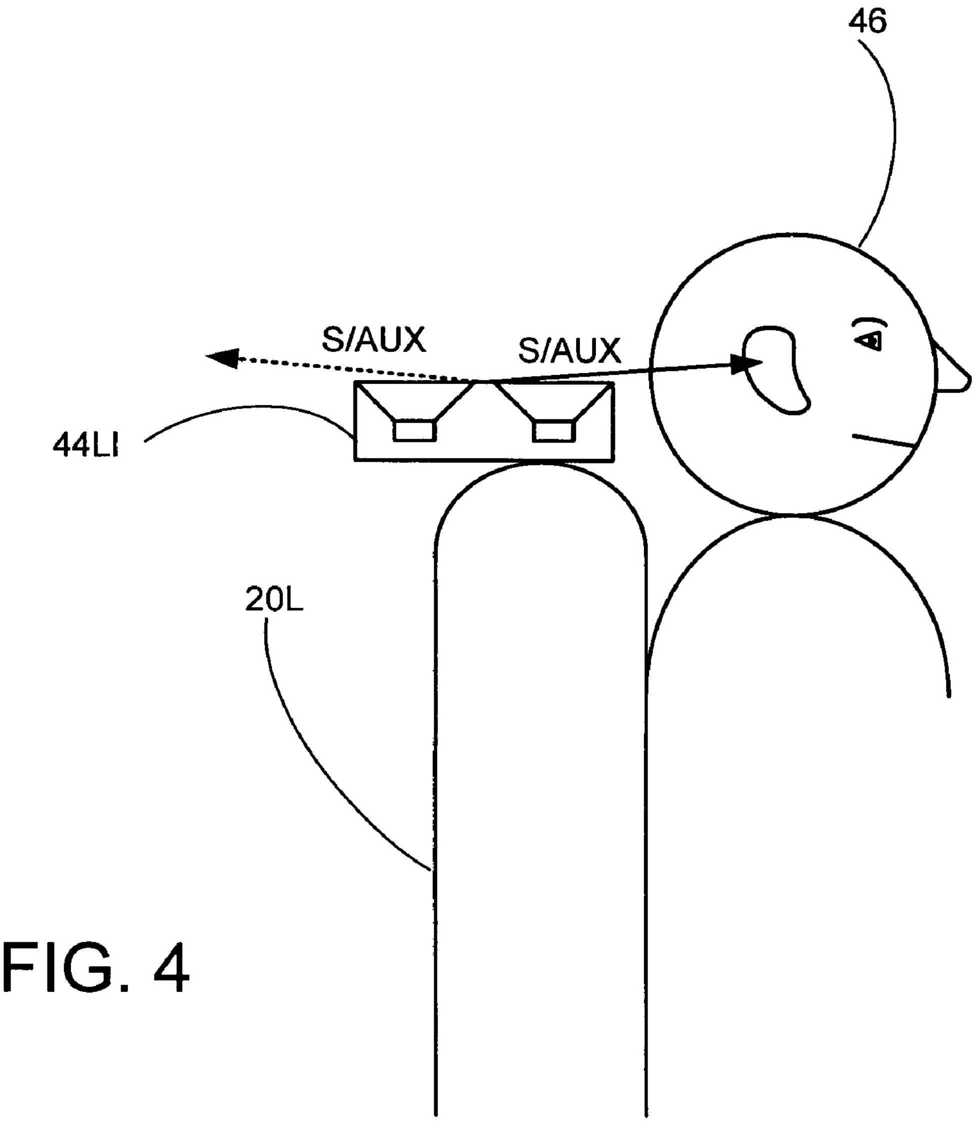
FIG. 4 is a diagrammatic view of a portion of a vehicle interior.

FIG. 4 shows another directional loudspeaker mounted in, near, or on a vehicle seat back. In the arrangement of FIG. 4, the audio signals from an auxiliary source, such as a "hands free" radiotelephone such as a cell phone are radiated directionally, so that the direction toward the occupant 46 of the driver seat 20L is a high radiation direction and the direction away from the occupant of the driver seat is a low radiation direction. An audio system incorporating the elements of FIG. 4 could also include circuitry that causes directional loudspeaker 44LI to radiate directionally audio signals from an auxiliary source as described above, and in the absence of signals from an auxiliary source, to radiate directionally a surround channel S so that the direction toward the driver is a high radiation direction and so that the direction away from the occupant 46 of the driver seat 20L is a low radiation direction.

Figure 5:
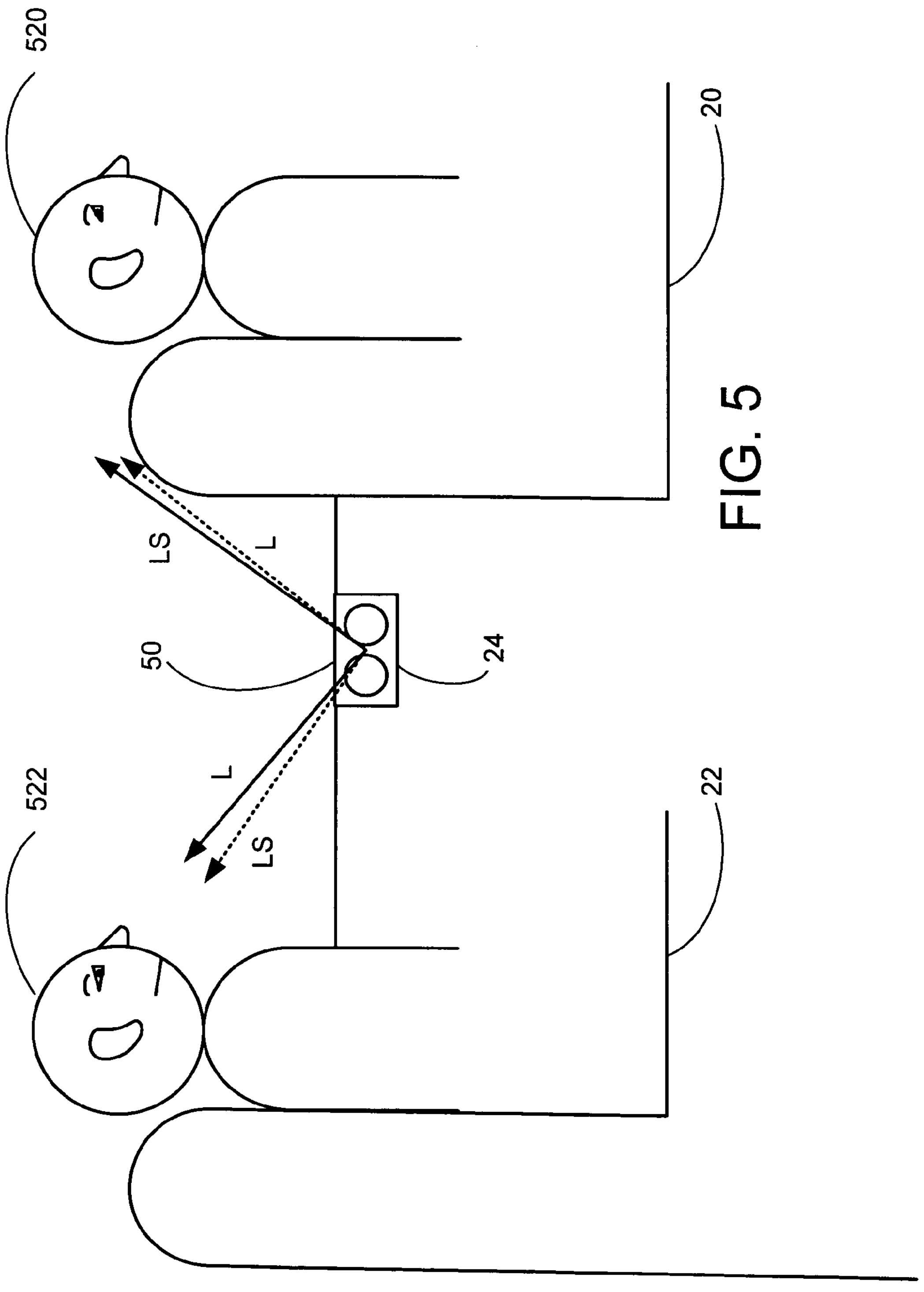
FIG. 5 is a diagrammatic view of a portion of a vehicle interior.

FIG. 5 shows an audio system with a directional loudspeaker 24, in this case a two element directional array, placed in the rear door. The directional loudspeaker 24 radiates directionally the left channel so that the direction toward the head 522 of an occupant of rear passenger position 22 is a high radiation direction and the direction toward front the head 520 of an occupant of front seat passenger position 20 is a low radiation direction; and radiates directionally the left surround channel so that the direction toward the head 522 of an occupant of rear passenger position 22 is a is a low radiation direction and so that the direction toward the head 520 of an occupant of front passenger position 20 is a high radiation direction. The passenger in front passenger position 20 hears the left surround channel from a source in back of the front passenger position, and a passenger in the rear seat position 22 hears the left channel from a source ahead of the rear seat position 22. The directional loudspeaker 24 can be mounted higher in the door, for example at the top 50 of the door panel, than a conventional loudspeaker, which results in improved acoustic performance. Conventional loudspeakers are typically mounted low in the door so that if the speaker is radiating left channel information, the conventional loudspeaker is not so close to the front seat passenger so that the front seat passenger localizes the left channel source as being in back of the front seat.

Delays, as described above in the discussion of FIG. 2D, may be used to supplement the directional cues caused by the directional loudspeakers.

Figure 6B:
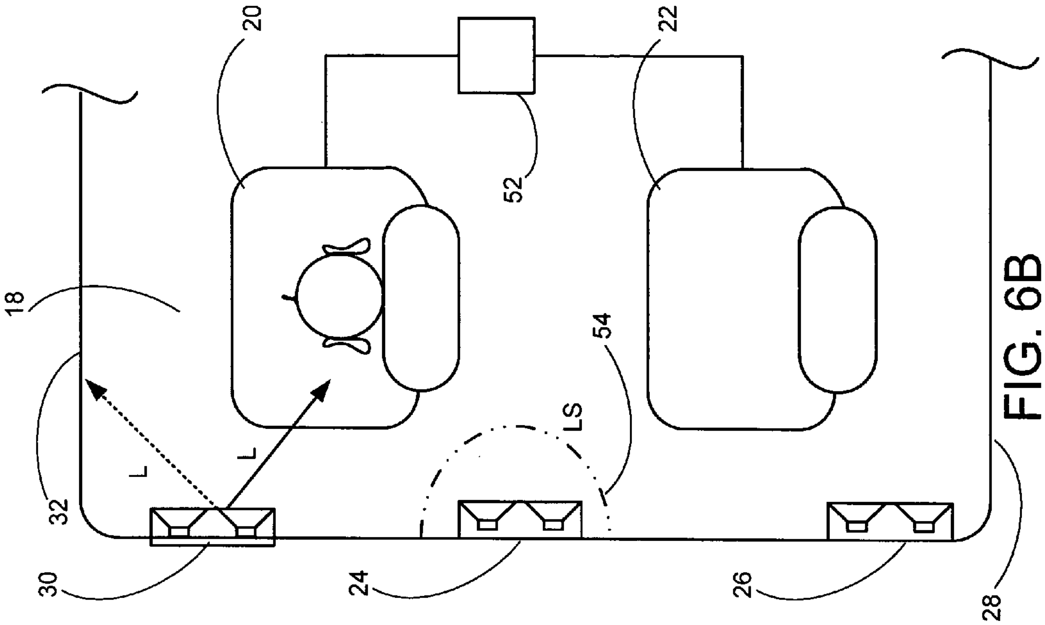
FIGS. 6A and 6B are diagrammatic views of a portion of a vehicle interior.
Figure 6A:
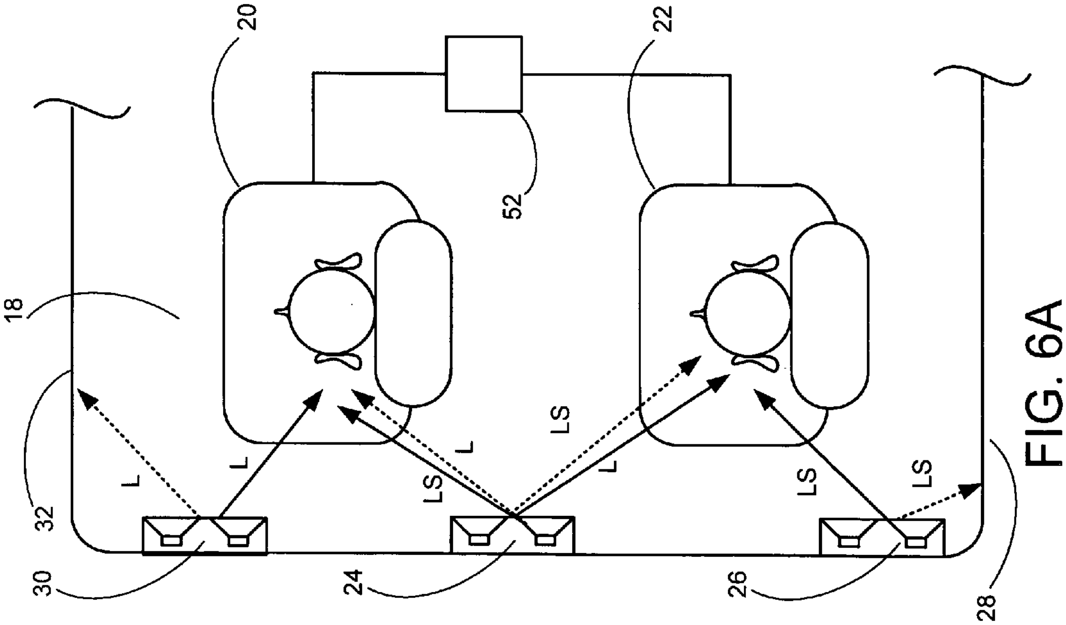

Referring to FIG. 6A, there is shown a vehicle passenger compartment with an audio system, similar to FIG. 2C. In addition to the elements of FIG. 2C, the arrangement of FIG. 6A includes sensing circuitry 52 that senses the presence or absence of a passenger in seat locations 20 and 22. Sensing circuitry 52 can be implemented for example by weight sensors in the seats or by optical sensors.

With passengers in both seat locations 20 and 22, the audio system of FIG. 6A operates as the audio system of FIG. 2C. In FIG. 6B, with no passenger in rear passenger position 22, the audio system may operate differently. For example rear directional loudspeaker 26 may radiate nothing as shown or may radiate the left surround channel directionally or omni-directionally, or may radiate low frequencies non-directionally. It is not necessary to radiate directionally the left surround channel from mid-vehicle directional loudspeaker 24 so that the direction toward rear passenger position 22 is a low radiation direction; instead, mid-vehicle directional loudspeaker 24 may radiate the left surround signal omni-directionally as shown, as indicated by semicircular polar plot line 54, may radiate nothing if rear directional loudspeaker 26 radiates the left surround channel, or may radiate low frequencies only. Radiating omni-directionally is more efficient than radiating directionally. Other forms of vehicle or passenger conditions can be used, and modifications to the operation of the directional loudspeakers can be used. For example, occupant height could be sensed, and the vertical direction of radiation adjusted; the open or closed state of the windows or the top up or down condition of a convertible could be sensed and the directional characteristics of the directional loudspeakers adjusted for the presence or lack of the reflecting or absorbing surfaces; or others. In general, the directivity of a directional loudspeaker can be varied depending on a sensed condition of the vehicle. As state above, signals applied to the directional loudspeaker may be delayed so that the precedence effect supplements magnitude cues to enhance the acoustic image.

Figure 7:
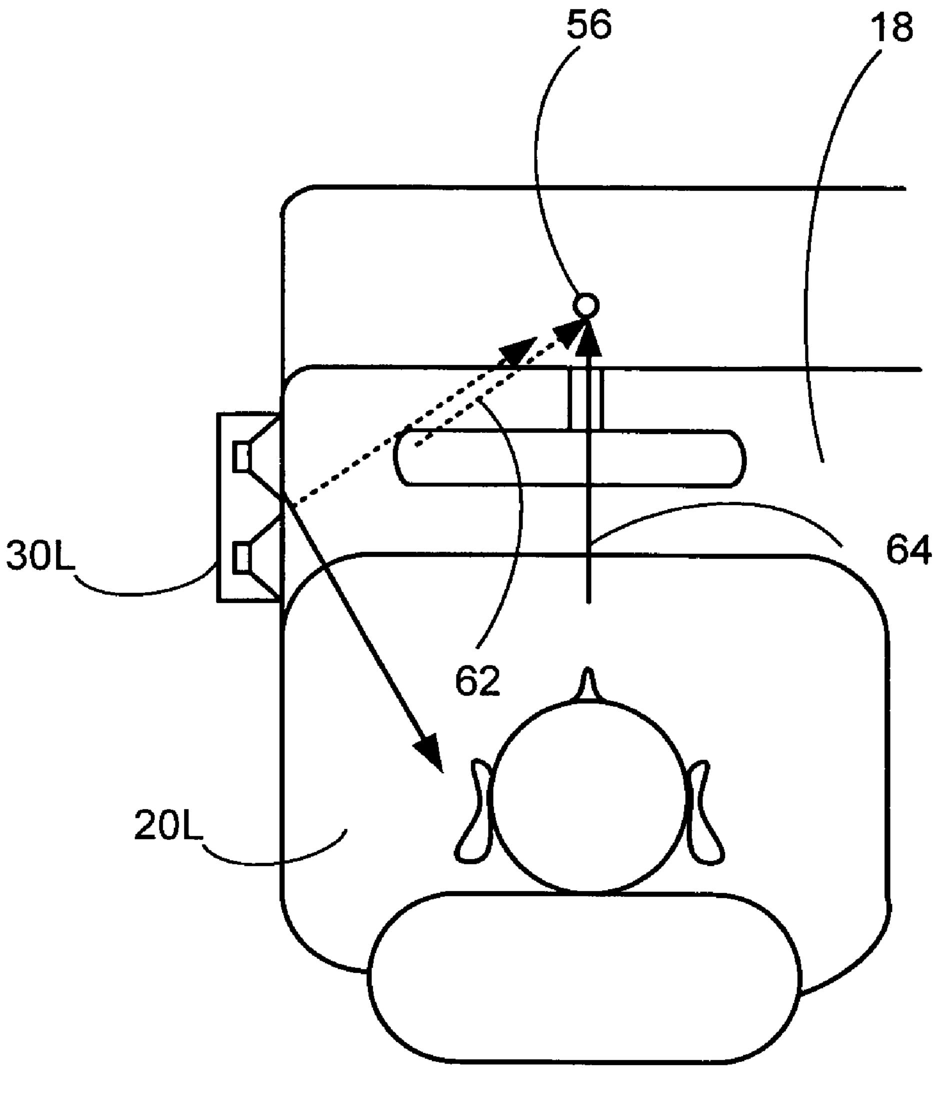
FIG. 7 is a diagrammatic view of a portion of a vehicle interior.

FIG. 7 shows a portion of a vehicle passenger compartment 18. At a convenient point, for example in the dashboard as shown, is mounted a microphone 56 for use with a hands free radiotelephone, a vehicle noise compensation system, or both. Directional loudspeaker 30L is mounted near the microphone, in this example in the front door. The directional loudspeaker 30L is constructed and arranged to radiate directionally an audio channel, for example the left channel of a surround sound system or a stereophonic system, so that the direction toward a passenger position, such as driver passenger position 20L is a high radiation direction. The directional loudspeaker 30L is further constructed and arranged to radiate directionally so that the direction toward microphone 56 is a low radiation direction. Causing the direction toward the microphone to be a low radiation direction allows the vehicle noise compensation system to obtain a more accurate reading of the ambient noise. Furthermore, radiating less acoustic energy toward a microphone used for radiotelephone communications improves the quality of communication and reduces the chance of feedback. The arrangement of FIG. 7 may be used with a directional microphones so that the microphone picks up sound preferentially from some directions (hereinafter high detection directions), such as the driver seat location as indicated by arrow 64, or so that the direction from a nearby speaker, such as directional loudspeaker 30L, to the microphone is a low pickup direction as indicated by arrow 62.

Numerous uses of and departures from the specific apparatus and techniques disclosed herein may be made without departing from the inventive concepts. Consequently, the invention is to be construed as embracing each and every novel feature and novel combination of features disclosed herein and limited only by the spirit and scope of the appended claims.

What is claimed is:

1. An audio system for a vehicle, the audio system comprising a plurality of audio channels, the vehicle comprising a first passenger position and a second passenger position ahead of the first passenger position, the audio system comprising:

a first directional loudspeaker positioned ahead of the first passenger position and in back of the second passenger position, constructed and arranged to radiate directionally a first audio channel so that a direction toward the first passenger position is one of a low radiation direction and a high radiation direction and so that a direction toward the second passenger position is the other of a low radiation direction and a high radiation direction, wherein the first directional loudspeaker is further constructed and arranged to radiate acoustic energy corresponding to signal in a second audio channel, wherein the first directional loudspeaker is further constructed and arranged to radiate directionally the second audio channel so that a direction toward the passenger position to which the first channel low radiation direction is directed is a second channel high radiation direction and the direction toward the passenger position to which the first channel high radiation direction is directed is a second channel low radiation direction.

2. An audio system in accordance with claim 1, the vehicle further comprising a third passenger position to the right and ahead of the first passenger position and to the right of the second passenger position and a fourth passenger position, to the right of the first passenger position, to the right and in back of the second passenger position, and in back of the third passenger position;

wherein the first directional loudspeaker is mounted in back of the second and the third passenger positions, ahead of the first and fourth passenger positions, to the right of the first and the second passenger positions, and to the left of the third and the fourth passenger positions; and wherein the first directional loudspeaker is further constructed and arranged to radiate directionally a third audio channel so that a direction toward the third passenger position is one of a low radiation direction and a high radiation direction and to radiate directionally a fourth audio channel so that the direction toward which the third channel low radiation direction is directed is a fourth channel high radiation direction.

3. An audio system in accordance with claim 1, further comprising circuitry for delaying one of a first audio channel signal and a second audio channel signal to the first directional loudspeaker.

4. An audio system in accordance with claim 3, further comprising circuitry for delaying the other of the first audio channel and the second audio channel to the second directional loudspeaker.

5. An audio system in accordance with claim 1, wherein the first directional loudspeaker is mounted in vehicle door.

6. An audio system in accordance with claim 1, wherein the first directional loudspeaker is mounted in or on a seatback of a seat associated with the second passenger position.

7. An audio system in accordance with claim 1, wherein the first directional loudspeaker is mounted in a headliner of the vehicle.

8. An audio system in accordance with claim 1, wherein the first directional loudspeaker is mounted in a B-pillar.

9. An audio system in accordance with claim 1, further comprising a second directional loudspeaker, positioned ahead of the second passenger position, constructed and arranged to radiate the first audio channel.

10. An audio system in accordance with claim 9, wherein the first directional loudspeaker is constructed and arranged to directionally radiate the first channel so that the direction toward the first passenger position is a high radiation direction and wherein the second directional loudspeaker constructed and arranged to radiate the first audio channel so that the direction toward the second passenger position is a high radiation direction.

11. An audio system in accordance with claim 10, wherein the second directional loudspeaker is further constructed and arranged to radiate the first audio channel so that a direction toward a vehicle windshield is a low radiation direction.

12. An audio system in accordance with claim 1, wherein the first directional loudspeaker is constructed and arranged to alternatively and automatically radiate omni-directionally or directionally based on pre-determined criteria.

13. An audio system for a vehicle, the audio system comprising a plurality of audio channels, the vehicle comprising a first passenger position and a second passenger position ahead of the first passenger position, the audio system comprising:

a first directional loudspeaker positioned ahead of the first passenger position and in back of the second passenger position, constructed and arranged to radiate directionally a first audio channel so that a direction toward the first passenger position is one of a low radiation direction and a high radiation direction and so that a direction toward the second passenger position is the other of a low radiation direction and a high radiation direction, wherein the first directional loudspeaker is constructed and arranged to alternatively radiate omni-directionally or directionally based on pre-determined criteria wherein the pre-determined criteria comprises the presence or absence of an occupant of the first passenger position.

14. An audio system in accordance with claim 13 further comprising a detector for detecting the presence or absence of an occupant of the first passenger position.

15. An audio system in accordance with claim 1, wherein the SPL in the low radiation direction is a level at least −6 dB with respect to the maximum radiation in any direction for points equidistant from the first directional loudspeaker.

16. An audio system in accordance with claim 15, wherein the SPL in the low radiation direction is a level at least −10 dB with respect relative to the maximum radiation in any direction for points equidistant from the first directional loudspeaker.

17. An audio system in accordance with claim 16, wherein the SPL in the high radiation direction is within 4 dB of the maximum radiation in any direction for points equidistant from the first directional loudspeaker.

18. An audio system in accordance with claim 1, the vehicle comprising a third passenger position in back of the first passenger position, the audio system further comprising a second directional loudspeaker positioned in back of the first directional loudspeaker and ahead of the third passenger position, constructed and arranged to radiate directionally the first audio channel so that the direction toward the first passenger position is one of a low radiation direction and a high radiation direction and so that the direction toward the third passenger position is the other of a low radiation direction and a high radiation direction.

19. An audio system in accordance with claim 18, wherein the second directional speaker is constructed and arranged to radiate directionally a second audio channel so that the direction toward the third passenger position is a high radiation direction and so that the direction toward the first passenger position is a low radiation direction.

20. An audio system in accordance with claim 1, further comprising circuitry for delaying a first channel audio signal to the first directional loudspeaker.

21. An audio system for a vehicle in accordance with claim 1, wherein the first directional loudspeaker is constructed and arranged to radiate directionally a second channel so that the direction toward the first passenger position is the other of a low radiation direction and a high radiation direction.

22. An audio system in accordance with claim 21, wherein the first directional loudspeaker is further constructed and arranged to radiate directionally the second channel so that the direction toward the second passenger position is the other of a low radiation direction and a high radiation direction.

23. An audio system in accordance with claim 22, wherein the SPL in the low radiation direction is a level at least −6 dB with respect to the maximum radiation in any direction for points equidistant from the first directional loudspeaker.

24. An audio system in accordance with claim 1, further comprising a third passenger position to the right and ahead of the first passenger position and to the right of the second passenger position, wherein the first directional loudspeaker is constructed and arranged to radiate directionally the first audio channel so that the direction toward the second passenger position is a high radiation direction and so that more acoustic energy is directed toward the third passenger position than is directed towards the second passenger position.

25. An audio system in accordance with claim 24, wherein the direction toward the second passenger position and the direction toward the third passenger position are both high radiation directions.

26. A method for operating a vehicle audio system for a vehicle, the audio system comprising a plurality of audio channels and a first directional loudspeaker, the vehicle comprising a first passenger position and a second passenger position ahead of the first passenger position, the method comprising:

radiating directionally by the first directional loudspeaker a first audio channel so that a direction toward the first passenger position is one of a low radiation direction and a high radiation direction and so that a direction toward the second passenger position is the other of a low radiation direction and a high radiation direction, further comprising radiating acoustic energy according to signals in a second audio channel by the first directional loudspeaker, wherein the radiating the second audio channel comprises radiating directionally the second audio channel so that a direction toward the passenger position to which the first channel low radiation direction is directed is a second channel high radiation direction and the direction toward the passenger position to which the first channel high radiation direction is directed is a second channel low radiation direction.

27. A method for operating a vehicle audio system for a vehicle, the audio system comprising a plurality of audio channels, the vehicle comprising a first passenger position and a second passenger position ahead of the first passenger position, the method comprising:

radiating directionally by a first directional loudspeaker a first audio channel so that a direction toward the first passenger position is one of a low radiation direction and a high radiation direction and so that a direction toward the second passenger position is the other of a low radiation direction and a high radiation direction; and radiating directionally by the first directional loudspeaker a second audio channel, wherein the radiating the second audio channel comprises radiating directionally the second audio channel so that a direction toward the passenger position to which the first channel low radiation direction is directed is a second channel high radiation direction and the direction toward the passenger position to which the first channel high radiation direction is directed is a second channel low radiation direction;

the vehicle further comprising a third passenger position to the right and ahead of the first passenger position and to the right of the second passenger position and a fourth passenger position, to the right of the first passenger position, to the right and in back of the second passenger position, and in back of the third passenger position and wherein the directional loudspeaker is mounted in back of the second and the third passenger positions, ahead of the first and fourth passenger positions, to the right of the first and the second passenger positions, and to the left of the third and the fourth passenger positions, the method further comprising radiating directionally a third audio channel so that a direction toward the third passenger position is one of a low radiation direction and a high radiation direction and radiating directionally a fourth audio channel so that the direction toward which the third channel low radiation direction is directed is a fourth channel high radiation direction.

28. A method in accordance with claim 26, further comprising delaying one of a first audio channel signal and a second audio channel signal to the first directional loudspeaker.

29. A method in accordance with claim 26, further comprising radiating omni-directionally a second audio channel.

30. A method in accordance with claim 26, the vehicle further comprising a second loudspeaker, positioned ahead of the second passenger position, the method further comprising radiating a second audio channel.

31. A method in accordance with claim 30, wherein radiating the second audio channel comprises radiating directionally the second audio channel so that the direction toward the second passenger position is a high radiation direction.

32. A method in accordance with claim 31, wherein the radiating the second audio comprises radiating directionally the second audio channel so that a direction toward a vehicle windshield is a low radiation direction.

33. A method in accordance with claim 26, wherein the radiating alternatively and automatically comprises one of radiating omni-directionally or radiating directionally based on pre-determined criteria.

34. A method for operating a vehicle audio system for a vehicle, the audio system comprising a plurality of audio channels and a first directional loudspeaker, the vehicle comprising a first passenger position and a second passenger position ahead of the first passenger position, the method comprising:

radiating directionally a first audio channel so that a direction toward the first passenger position is one of a low radiation direction and a high radiation direction and so that a direction toward the second passenger position is the other of a low radiation direction and a high radiation direction, wherein the radiating is alternatively comprises one of radiating omni-directionally or radiating directionally based on pre-determined criteria, wherein the pre-determined criteria comprise the presence or absence of an occupant of the first passenger position.

35. A method in accordance with claim 34 further comprising detecting the presence or absence of an occupant of the first passenger position.

36. A method in accordance with claim 26, wherein the SPL in the low radiation direction is a level at least −6 dB with respect to the maximum radiation in any direction for points equidistant from the first directional loudspeaker.

37. A method in accordance with claim 36, wherein the SPL in the low radiation direction is a level at least −10 dB with respect to the maximum radiation in any direction for points equidistant from the first directional loudspeaker.

38. A method in accordance with claim 37, wherein the SPL in the high radiation direction is within 4 dB of the maximum radiation in any direction for points equidistant from the first directional loudspeaker.

39. A method in accordance with claim 26, the vehicle comprising a third passenger position in back of the first passenger position, the audio system further comprising a second directional loudspeaker positioned in back of the first directional loudspeaker and ahead of the third passenger position, the method further comprising radiating directionally the first audio channel so that the direction toward the first passenger position is one of a low radiation direction and a high radiation direction and so that the direction toward the third passenger position is the other of a low radiation direction and a high radiation direction.

40. A method in accordance with claim 39, further comprising radiating directionally a second audio channel so that the direction toward the third passenger position is a high radiation direction and so that the direction toward the passenger position toward which the first channel high radiation is directed is a low radiation direction.

41. An audio system in accordance with claim 26, further comprising delaying a first channel audio signal to the first directional loudspeaker.

42. A method for operating a vehicle audio system for a vehicle in accordance with claim 26, further comprising radiating directionally a second channel so that the direction toward the second passenger position is the one of a low radiation direction and a high radiation direction and so that the direction toward the first passenger position is the other of the high radiation direction and the low radiation direction.

43. A method in accordance with claim 42, wherein the SPL in the high radiation direction is within 4 dB of the maximum radiation in any direction for points equidistant from the first directional loudspeaker.

* * * * *